United States Patent

Okada et al.

[11] Patent Number: 5,892,587
[45] Date of Patent: Apr. 6, 1999

[54] STORE-AND-FORWARD METHOD FOR FAX MAIL APPARATUS

[75] Inventors: Akihiro Okada; Mitsuyo Hasegawa, both of Kawasaki, Japan

[73] Assignee: Fujitsu Limited, Kanagawa, Japan

[21] Appl. No.: 856,043

[22] Filed: May 14, 1997

Related U.S. Application Data

[63] Continuation of Ser. No. 407,205, Mar. 20, 1995, abandoned.

[30] Foreign Application Priority Data

Jul. 5, 1994 [JP] Japan .................................. 6-153382

[51] Int. Cl.$^6$ ...................................................... H04N 1/00
[52] U.S. Cl. ............................................ 358/402; 358/407
[58] Field of Search .................................... 358/402, 407, 358/405, 468, 434, 444, 437, 440, 433, 442, 453, 449, 448

[56] References Cited

U.S. PATENT DOCUMENTS

| | | | |
|---|---|---|---|
| 4,922,348 | 5/1990 | Gillon et al. ............................ | 358/407 |
| 5,050,006 | 9/1991 | Ogawa .................................... | 358/402 |
| 5,084,770 | 1/1992 | Nakayama ............................... | 358/402 |
| 5,367,564 | 11/1994 | Sutoh et al. ............................ | 358/407 |
| 5,457,544 | 10/1995 | Ochiai .................................... | 358/404 |
| 5,459,584 | 10/1995 | Gordon et al. .......................... | 358/402 |
| 5,481,374 | 1/1996 | Tachibana et al. ...................... | 358/404 |

FOREIGN PATENT DOCUMENTS 3126360  5/1991  Japan .

*Primary Examiner*—Edward L. Coles
*Assistant Examiner*—Cheukfan Lee
*Attorney, Agent, or Firm*—Helfgott & Karas, P.C.

[57] ABSTRACT

A store-and-forward method for a fax mail apparatus for storing mail information being sent from a fax machine and transmitting the mail information to a designated destination in which the fax mail apparatus divides the received mail information by page, or predetermined size if the amount of data in a page exceeds that size, regards receipt of the first division unit as receipt of the entire mail information in the unit of one message, and, when receiving the first division unit, sequentially transmits the mail information by division unit from the fax mail apparatus to a destination fax machine.

15 Claims, 19 Drawing Sheets

FIG. 8

DLET

| (ENTRY) | (CONTENT) | (SET/RESET SECTION) |
|---|---|---|
| DELIVERY REGISTRATION TIME | :TIME WHEN DELIVERY IS RESERVED | :DELIVERY REGISTRATION UNIT |
| DELIVERY TIME | :TIME WHEN DELIVERY PROCESSING IS STARTED | :DELIVERY REGISTRATION UNIT |
| DELIVERY PROCESSING STATUS | :UNCOMPLETED/WAIT FOR RETRANSMISSION/DURING RETRANSMISSION | :DELIVERY REGISTRATION UNIT |
| REQUESTER NAME | :NAME OF REQUESTER | :DELIVERY REGISTRATION UNIT |
| REQUESTER POSITION | :POSITION OF REQUESTER | :DELIVERY REGISTRATION UNIT |
| REQUESTER ID | :ID NUMBER OF REQUESTER | :DELIVERY REGISTRATION UNIT |
| REQUESTER NOTIFICATION FAX | :FAX TELEPHON NUMBER OF REQUESTER (FOR ACCEPTANCE/NOTIFYING RESULT) | :DELIVERY REGISTRATION UNIT |
| DELIVERY CONDITION | :ORDINARY /EXPRESS/TIME-SPECIFIED/CONFIDENTIAL | :DELIVERY REGISTRATION UNIT |
| DESTINATION INFORMATION | :FAX NUMBER OF DESTINATION | :DELIVERY REGISTRATION UNIT |
| INFORMATION STORAGE LOCATION | :INFORMATION OF LOCATION WHERE ACTUAL FAX INFORMATION IS STORED | :DELIVERY REGISTRATION UNIT |
| NUMBER OF TIMES OF RETRANSMISSION | :NUMBER OF TIMES OF ALREADY PERFORMED /SPECIFIED NUMBER OF TIMES | :DELIVERY REGISTRATION UNIT/DELIVERY PROCESSING UNIT |
| NUMBER OF COMPLETED PAGE | :NUMBER OF PAGES ALREADY DELIVERED/TOTAL NUMBER OF PAGES | :DELIVERY REGISTRATION UNIT/DELIVERY PROCESSING UNIT |
| EXISTENCE OF ADDITION | :ADDITION/NON-ADDITION | |

STORE-AND-FORWARD METHOD FOR FAX MAIL APPARATUS

This is a continuation, of application Ser. No. 08/407,205, filed Mar. 20, 1995, now abandoned.

BACKGROUND OF THE INVENTION

This invention relates to a fax mail apparatus and store-and-forward method therefor. More particularly, the invention relates to a fax mail apparatus storing fax mail information sent from a facsimile apparatus (fax apparatus) and forwarding the mail information to a designated destination, and store-and-forward method therefor.

A fax mail store-and-forward method has been proposed and put into practical use in the prior art. According to the fax mail store-and-forward method, a facsimile mail apparatus (fax mail apparatus) is connected to an exchange, a document is transmitted from a facsimile machine (fax machine) to the fax mail apparatus with a destination designated, and the document (mail information) is once stored in the fax mail apparatus, and then transmitted to individual destination or a plurality of destinations (in the case of broadcasting). FIG. 17 is a block diagram showing the construction of the communication system with such fax mail store-and-forward feature, and FIG. 18 is a diagram for describing the procedure of mail transmission.

In FIG. 17, there are shown an exchange such as a private branch exchange (PBX) 1, a fax mail apparatus 2 connected to the PBX, a originating fax machine 3 used by an originator, and destination fax machines 4a–4n used by receiving individuals (hereinafter referred to as "receivers").

When the originator 3 desires to transmit a document to the receiver 4a, he or she dials the telephone number of the fax mail apparatus 2, whereupon the PBX 1 connects the originator 3 and the fax mail apparatus 2. When the circuit has been connected, the fax mail apparatus 2 issues audio guidance so that the originator may sequentially enter a subscriber ID, a password, a function code, and a destination number or destination-list number. Functions of the fax mail apparatus include ordinary transmission, express transmission, confidential transmission, and time-specified transmission for each of which individual and broadcast transmissions are provided.

In accordance with the audio guidance, the originator sequentially enters the subscriber ID and the password that have been designated for him or her, a function code indicating the individual or broadcast transmission, and finally a number depending on the destination 4a.

The fax mail apparatus 2 checks to determine whether the entered subscriber ID and password agree with those registered. If agreement is not found, the fax mail apparatus 2 regards this as meaning that the originator is illegal and disconnects the circuit. If agreement is found, however, the fax mail apparatus 2 instructs the originator 3 to transmit the document and then temporarily stores the document (the fax mail information) in an internal memory once the document has been transmitted from the originator. Refer to A in FIGS. 17 and 18. Then, the fax mail apparatus 2 automatically transmits the mail information to the receiver 4a (see B in FIGS. 17 and 18). When the transmission has been completed, the fax mail apparatus 2 notifies the fax machine 3 of the originator of the delivery result by means of a printed message (see C in FIGS. 17 and 18).

In the case of broadcast transmission, the fax mail apparatus 2 temporarily stores the fax mail information in the internal memory once the fax mail information has been transmitted from the originator, and automatically broadcasts the mail information to multiple receivers according to the destination list which has been separately entered. When the broadcast transmission has been completed, the fax mail apparatus 2 notifies the fax machine 3 of the originator of the delivery result by means of a printed message.

In the case of time-specified transmission, the fax mail apparatus 2 temporarily stores the fax mail information in the internal memory once the fax mail information has been transmitted from the originator, and automatically transmits the mail information to the destination at the time of day which has been separately entered.

In the case of confidential transmission, the fax mail apparatus 2 stores the mail information in the memory, and notifies the destination of the fact that it has received fax mail information in confidential. Then, after the user at the destination enters a predetermined ID number, the fax mail apparatus 2 transmits the fax mail information stored in the memory to the fax machine at the destination.

FIG. 19 is a block diagram showing the construction of the communication system with the fax mail function when two fax mail apparatuses are connected by a private trunk circuit network. In the figure, there are shown fax machines 11a–11d, public telecommunication networks 12a and 12b, exchanges such as PBXs 13a and 13b, fax mail apparatuses 14a and 14b, and a mail trunk circuit network 15 for connecting the fax mail apparatuses 14a and 14b with leased circuits.

Description is made on a case where a document is transmitted from a fax machine 11a to a remote fax machine 11c. When the telephone number of the originating fax mail apparatus 14a is dialed from the fax machine 11a, the public telecommunication network 12a and the exchange 13a connect the circuit between the fax machine 11a and the fax mail apparatus 14a. Then, a subscriber ID, a function code (for example, ordinary/individual transmission), and the telephone number of the fax machine at the destination are sequentially entered from the fax machine 11a. The fax mail apparatus 14a check to determine whether the entered subscriber ID and password agree with those registered. If agreement is not found, the mail fax apparatus 14a regards this as meaning that the originator is illegal and disconnects the circuit. If agreement is found, however, the fax mail apparatus 14a instructs the originator to transmit the document and temporarily stores it (fax mail information) in an internal memory once it has been transmitted by the originator. Then, the fax mail apparatus 14a automatically transmits the document (mail information) to the destination fax mail apparatus 14b through the trunk circuit network 15 of a leased circuit. The fax mail apparatus 14b temporarily stores the mail information in an internal memory, calls the destination fax machine 11c after all mail information have been received, and automatically transmits the mail information to the destination fax machine 11c through the exchange 13b and the public telecommunication network 12b.

As described above, the communication system of FIG. 19 can perform the fax transmission through a public-leased-public connection (public network-leased circuit-public network), and reduce the communication charge. For example, when the fax mail apparatuses 14a and 14b are installed at Tokyo and Sapporo, respectively, and connected by a leased circuit (mail trunk circuit network), new charge is for the public networks in the Tokyo and Sapporo areas so that the communication charge can be saved. The charge for the leased circuit is separately paid to a communication service provider.

Furthermore, the communication system of FIG. 19 can also reduce the band in the fax information trunk circuit network, and save the labor and time for distributing information through facsimile.

According to the store-and-forward method by the conventional fax mail apparatuses of FIGS. 17 and 19, delivery of the first page of document to the destination fax machine starts after entire document have been entered. FIG. 20 is a diagram illustrating transmission of the n-th page of the document. After all pages are once transmitted from the originating fax machine to the fax mail apparatus, the fax mail apparatus sequentially transmits the document from the first page to the destination fax machine or the destination fax mail apparatus.

Thus, the store-and-forward method according to the conventional fax mail apparatus has a problem that it takes much time until the destination fax machine outputs the document, and, particularly, the more the number of pages of document is, the longer the time until the output of the document is.

SUMMARY OF THE INVENTION

Accordingly, an object of the present invention is to provide a fax mail apparatus and store-and-forward method therefor which can shorten the time until a destination fax machine outputs a document.

Another object of the present invention is to provide a fax mail apparatus and store-and-forward method therefor which can shorten the time until a destination fax machine outputs a document even if it has much number of pages.

Still another object of the present invention is to provide a fax mail apparatus and its store-and-forward method therefor which can perform delivery in a time equivalent to a ordinary fax-to-fax transmission.

Yet another object of the present invention is to provide a fax mail apparatus and store-and-forward method therefor which can save fax fee.

According to the present invention, these object can be attained by a store-and-forward method for fax mail apparatus storing mail information sent from a fax machine and transmit the mail information to a designated destination fax machine wherein the method comprises steps of dividing the received mail information by page or by a predetermined size when amount of data in one page exceeds the predetermined size, regarding receipt of a first division unit as receipt of the entire mail information, and sequentially transmitting the mail information in the division unit from the fax mail apparatus to the destination fax machine after receipt of the mail information in the first division unit.

Furthermore, the above objects can be attained by a fax mail apparatus for storing mail information sent from a fax machine and transmitting the mail information to a designated destination fax machine, wherein the fax mail apparatus comprises a receiver unit for receiving the mail information from a circuit, a division unit for dividing the received mail information by page or predetermined size and linking each division unit by a pointer, a storage means for storing each division unit of the mail information linked by the pointers, a delivery processing unit for regarding receipt of a first division unit as receipt of the entire mail information and then performing processing for sequentially delivering the received mail information by the division unit, and a transmitter unit for transmitting the mail information by the division unit to the destination fax machine.

Other features and advantages of the present invention will be apparent from the following description taken in conjunction with the accompanying drawings

BRIEF DESCRIPTION OF THE DRAWINGS

FIG. 8 is a diagram for illustrating a delivery reservation table;

DESCRIPTION OF THE PREFERRED EMBODIMENTS (a) Overview of the Present Invention

Figure 1A:
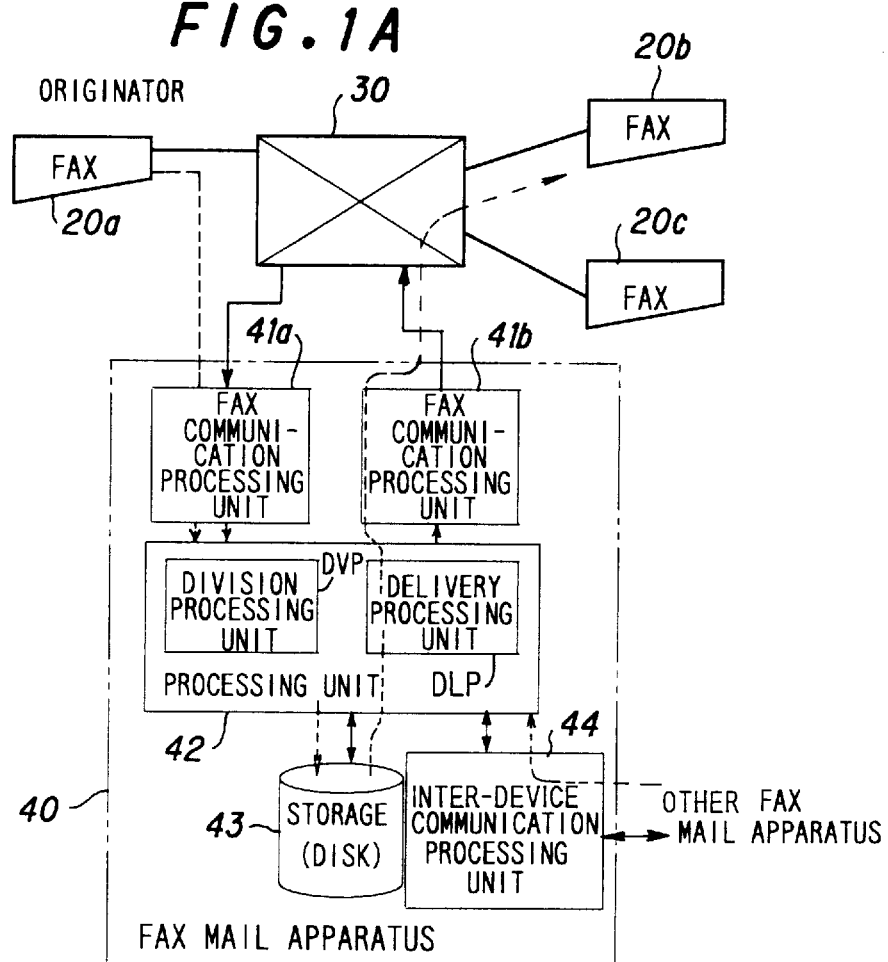
FIGS. 1A and 1B are diagrams for illustrating the principle of the present invention.

There are shown facsimile machines (fax machines) 20*a*–20*c*, an exchange 30, and a fax mail apparatus 40. The fax mail apparatus 40 has fax communication processing units 41*a* and 41*b*, a processing unit 42 for controlling the transmission of fax mail, a division processing unit DVP for dividing the mail information into page units or units of a predetermined size and linking each division unit by a pointer, and a delivery processing unit DLP for regarding receipt of a first division unit as receipt of entire mail information, and then performing processing for sequentially delivering the received mail information by the division unit to a destination fax machine. There are also shown a storage unit (disk unit) 43 for storing the fax mail information in division unit linked by pointers, and an inter-device communication processing unit 44 for communicating with another fax mail apparatus through a leased circuit.

The division processing unit DVP in the fax mail apparatus 40 divides (1) fax mail information received from the originating fax machine 20*a*, through the exchange 30 and the fax communication unit 41a, or (2) fax mail information received from another fax mail apparatus through a leased circuit and the inter-device communication processing unit 44. The fax mail information is divided into, for example, page units, or units of a predetermined size if the amount of data in one page exceeds the predetermined size. (3) The division processing unit DVP in the processing unit 42 also sequentially links the divided fax mail information (fax mail information in division units) by pointers, and stores them in the storage unit 43. (4) The delivery processing unit DLP in the processing unit 42 regards receipt of the first division unit as receipt of entire fax information, and calls the destination fax machine 20b through the fax communication processing unit 41b. Then, the delivery processing unit DLP sequentially reads the mail information stored in the storage unit 43 by division unit in accordance with the indication of pointers, and transmits it to the fax machine 20b through the fax communication processing unit 41b and the exchange 30.

Figure 1B:
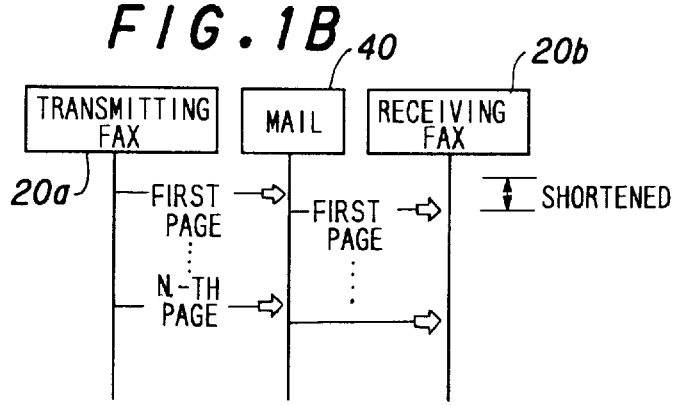

As described, the destination fax machine can output the document more quickly without regard to the number of pages of the document because the fax mail information is divided into page units or units of the predetermined size, the receipt of the first division unit is regarded as receipt of the entire mail information, and the fax mail information is sequentially transmitted to the destination fax machine by division unit after the receipt of the first division unit (see FIG. 1B). In addition, it is possible to deliver the document in a time substantially equal to that in a conventional inter-fax communication, and to save the fax communication charge because the transmission is performed in a public-leased-public connection. Furthermore, since it is arranged that, if a page of the document contains much amount of data, the page is divided into a predetermined size, the next division unit is received prior to completion of transmission of the current division unit. Accordingly, after completion of transmission of the current division unit, the next division unit is transmitted to the destination fax machine within a prescribed period of time so that the entire fax mail information is continuously transmitted in one circuit connection.

The processing unit 42 previously stores the speed for receiving the fax mail information being sent from the originating fax machine 20a (the speed is known from negotiation), and makes the transmission speed slower than the receiving speed when the fax mail information is transmitted to the destination by the division unit. Thus, the fax mail information of the next division unit is always placed in the storage unit 43 by making the transmission speed slower than the receiving speed. As a result, after the transmission of the current division unit is completed, the next division unit is surely transmitted within a prescribed period of time so that the entire fax mail information is continuously transmitted in one circuit connection.

Furthermore, there is provided a delivery reservation table which stores in correspondence to the fax mail information requested for transmission, delivery reservation information including at least a transmission requester, a destination, distinction of completed and uncompleted transmission, and number of units completed for transmission by division unit in case of uncompleted transmission. In a case where the circuit is disconnected during transmission to a destination, the number of division units uncompleted and completed for transmission is written in the corresponding delivery reservation information in the delivery reservation table. Thereafter, the delivery reservation information for uncompleted transmission is found by reference to the delivery reservation table, and the fax mail information corresponding to the delivery reservation information uncompleted for transmission is retransmitted by division unit. Thereby, even if the circuit is disconnected during transmission under some reason, the transmission can be automatically resumed after such reason is eliminated.

Furthermore, there is provided a delivery reservation table which stores in correspondence to the fax mail information requested for transmission, delivery reservation information including at least a transmission requester, a destination, distinction of completed and uncompleted transmission, and number of units completed for transmission by division unit in case of uncompleted transmission. When new mail information is requested for transmission, the delivery reservation table is checked for determining whether delivery reservation information having the same destination is registered therein. If registered, the new fax mail information is added to the fax mail information corresponding to the registered delivery reservation information. With such arrangement, a plurality of fax mail information with the same destination can be transmitted in one connection of the circuit.

(b) Principle of Store-and-Forward method according to the Present Invention

The store-and-forward method of the conventional fax mail apparatus takes longer time until the destination fax machine outputs the document. Particularly, the more the number of pages of the document is, the longer the time is until output. Therefore, it is considered that the fax mail information is divided by, for example, unit of a page, and the division unit is regarded as one fax information for transmission. However, such approach requires circuit disconnection and connection in the number equal to the number of division units.

Thus, according to the present invention, the document (fax mail information) is divided into each page, and the divided fax mail information is linked by pointers and stored in the storage unit. Then, receipt of the first page is regarded as receipt of the entire fax mail information, and, thereafter, the fax mail information is read from the storage unit by page in the order indicated by the pointers, and transmitted to the destination fax machine. With such approach, the time from receipt to output of the first page can be reduced even if the document has many pages. In addition, the document can be continuously transmitted with one connection of circuit.

Figure 2:
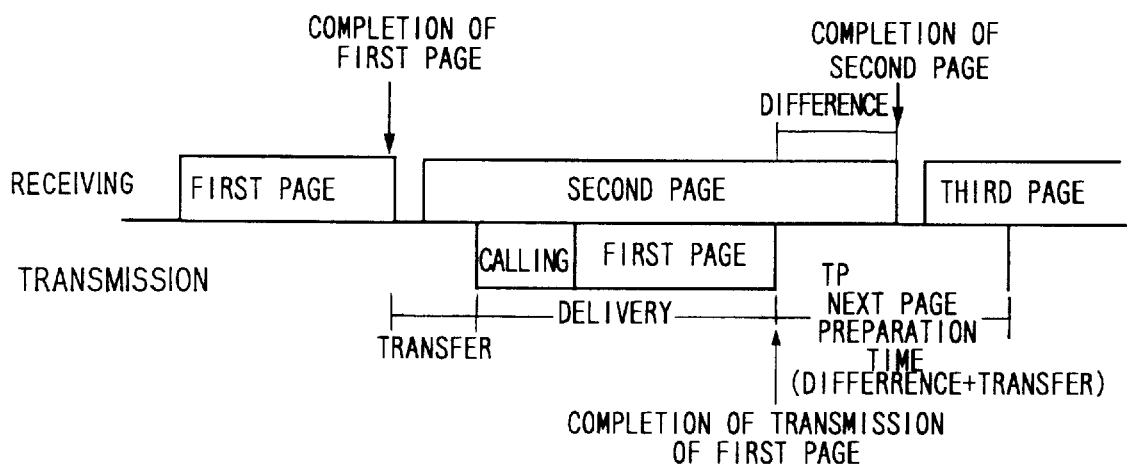
FIG. 2 is a diagram for explaining problems in division into a unit of page.

In such approach, however, the following problem arises when the amount of data differs from page to page. That is, as shown in FIG. 2, there arises such situation where, at the time when the transmission of the first page is completed, the second page is not yet completely received. In such case, the time (referred to as the next page preparation time Tp) from completion of transmission of the first page till transmission of the second page becomes longer. Generally, the next page preparation time Tp is recommended to be 35 seconds (timer value of fax procedure). In a case where the transmission of the next page is not started even if the time corresponding to the timer value elapses, the fax mail apparatus disconnects the circuit. Therefore, it is necessary to make the next page preparation time Tp shorter than the timer value.

Figure 3:
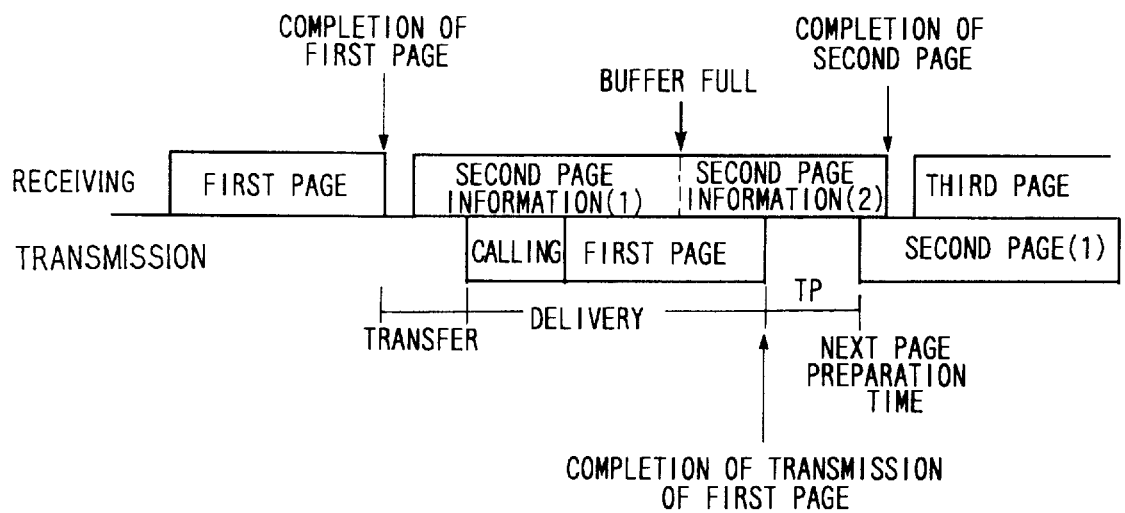
FIG. 3 is a diagram for illustrating a division unit according to the present invention.

For this reason, as shown in FIG. 3, according to the present invention, further the fax mail information is divided by page, or a predetermined size if the amount of data in one page exceeds the predetermined size. Then, the divided fax mail information (division units) is sequentially linked by the pointers and stored in the storage unit. Then, when the first division unit is received, it is regarded that the entire fax mail information is received. Thereafter, the fax mail information is read from the storage unit by division unit in the order indicated by the pointers, and transmitted to the destination fax machine.

With such arrangement, even if one page has a large size of data, the page is fragmented as shown in FIG. 3, thereby the next page preparation time Tp which is period from the completion of transmission of the first division unit (first page) till the start of transmission of the second division unit (the first half of the second page) is reduced to less than the timer value of fax procedure (=35 seconds) whereupon no circuit disconnection occurs.

Figure 4:
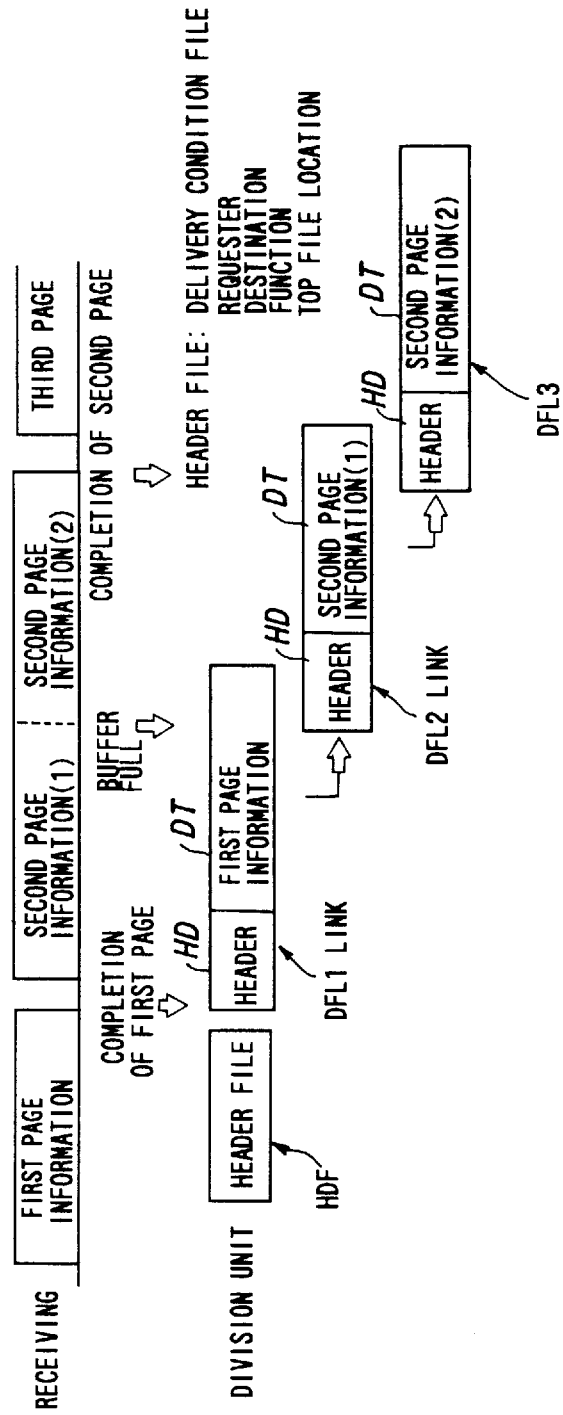
FIG. 4 is a diagram for illustrating another division unit.

FIG. 4 is a diagram for illustrating the division unit of the present invention. One header file HDF is created for each fax mail information as well as data files DFL1, DFL2, DFL3, . . . containing headers HD and information DT are created for each division unit, and a pointer contained in each header indicates the storage position of the next data file so as to link the data file continuously.

Hereinafter, the description is made by taking the following into consideration, (1) the fax mail information is divided by page if the amount of data in one page is less than or equal to a predetermined buffer size, and (2) it is divided by predetermined buffer size if the amount of data in one page exceeds the predetermined buffer size. However, regardless of the amount of data in one page, the fax mail information may be divided by page or data buffer size.

(c) Hardware Configuration of Fax Mail Apparatus

Figure 5:
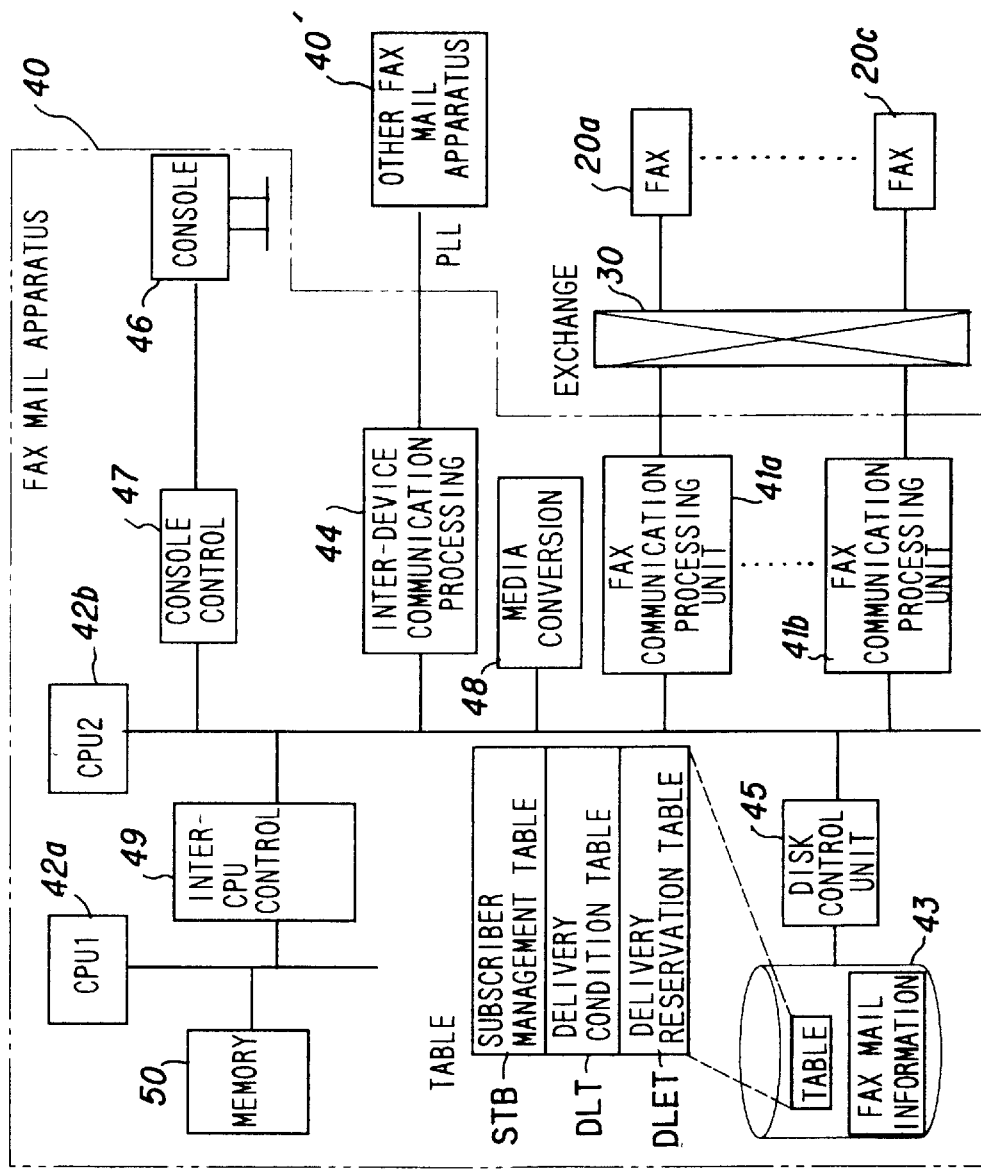
FIG. 5 is a diagram showing the configuration of a fax mail apparatus (hardware)
Figure 19:
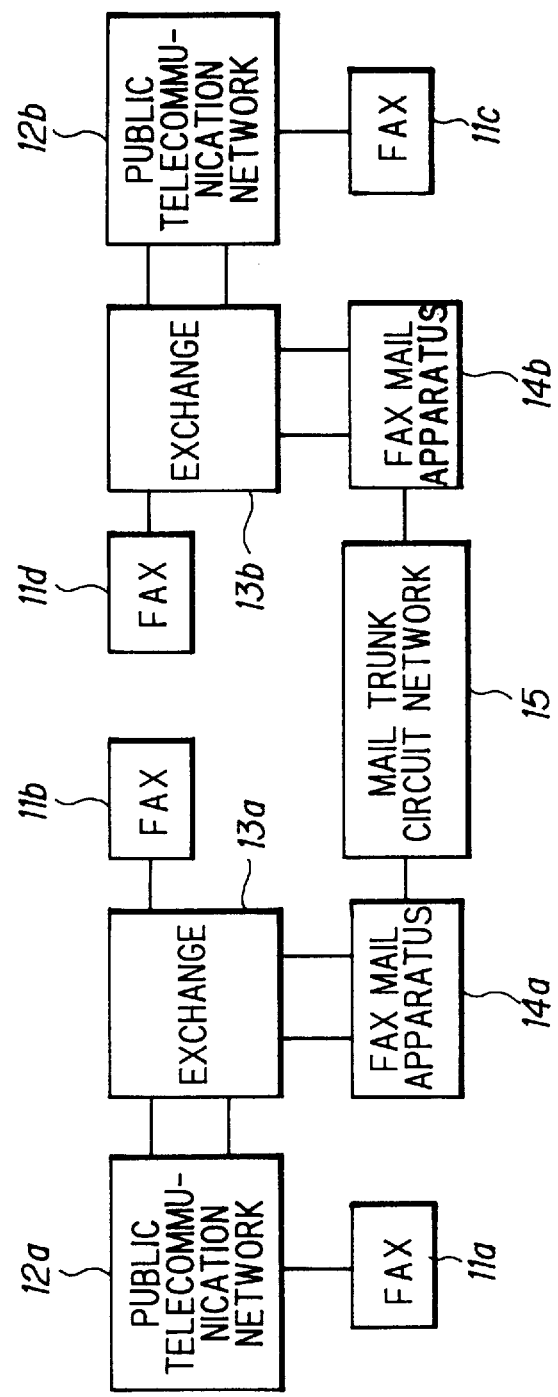
FIG. 19 is an another diagram showing the construction of a conventional communication system having a mail function.
Figure 20:
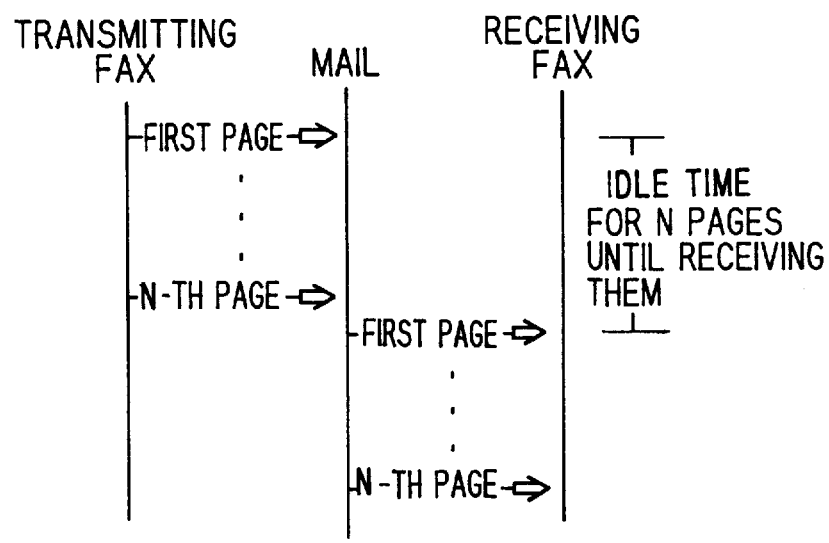
FIG. 20 is a diagram for explaining problems in the store-and-forward method of a conventional facsimile mail apparatus.

FIG. 5 is a hardware configuration of the fax mail apparatus according to the present invention, which can be applied to the communication system of FIG. 19.

There are shown the facsimile machines (fax machines) 20a–20c, an exchange 30, a fax mail apparatus 40, and other fax mail apparatus 40'. The fax mail apparatus 40 includes fax communication processing units 41a, 41b, . . . connected to the exchange 30 for processing access procedure and fax communication procedure, a control processor 42a for controlling the whole of the apparatus, and an another control processor 42b for executing input/output control. The fax mail apparatus 40 also includes a disk unit 43 for storing programs, various tables, fax mail information or the like, an inter-device communication processing unit 44 for sending and receiving information such as inter-device control information and fax data to and from the other fax mail apparatus 40' through a leased circuit PLL, a disk controller 45, a console 46 for displaying status of devices and providing necessary instructions, a console controller 47, a medium convertor 48 for generating various fax notification forms, an inter-CPU controller 49 for delivering control information and data between the control CPUs 42a and 42b, and a memory 50 in which a fax data buffer region, a program operating region (working region) and the like are provided.

There are tables such as a subscriber management table STB for storing subscriber IDs and the like, a delivery condition table DLT for storing delivery conditions of fax mail information, and a delivery reservation table DLT.

(c-1) Fax communication processing unit

Figure 6:
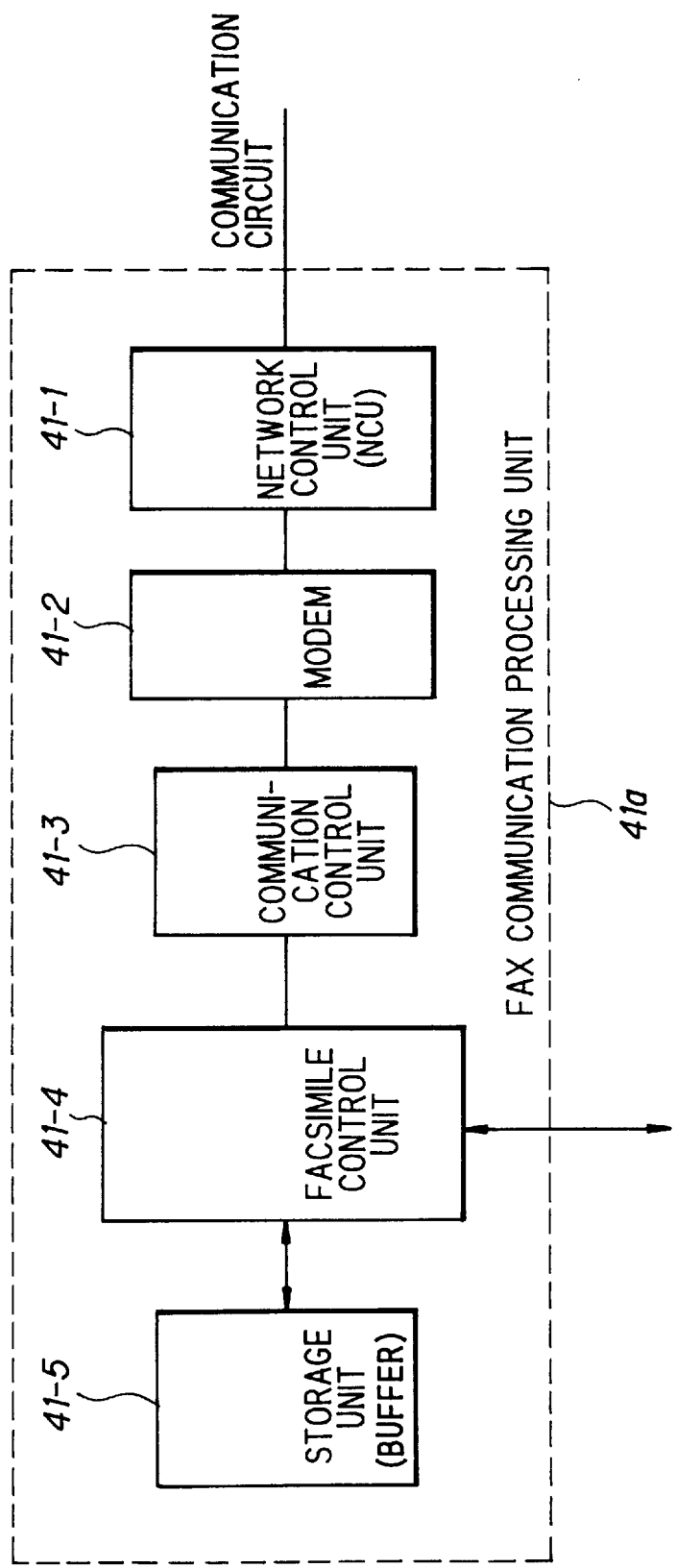
FIG. 6 is a diagram showing the configuration of a fax communication processing unit.

The fax communication processing units 41a and 41b have configurations shown in FIG. 6. In the figure, there are shown a network control unit (NCU) 41-1 for establishing a circuit through a procedure similar to that of an ordinary telephone, a modem 41-2 for converting (modulating) data of "1" and "0" into alternating current signals suited to an analog transmission band and transmitting the modulated signal, as well as receiving a modulated signals and reproducing (demodulating) the original data of "1" and "0," a communication control unit 41-3 for controlling transmission/receipt of data, a fax control unit 41-4 for performing reception control and transmission control, and a storage unit 41-5 (buffer memory) for temporarily storing the received fax mail information, and temporarily storing fax mail information to be transmitted. The network control unit 41-1, in addition to possessing functions similar to those of a telephone, such as functions for connecting and disconnecting the facsimile section and the exchange 30, transmitting dial pulses, etc., also is capable of recognizing a ring-back tone and a busy tone and of automatically establishing data circuits.

Figure 7:
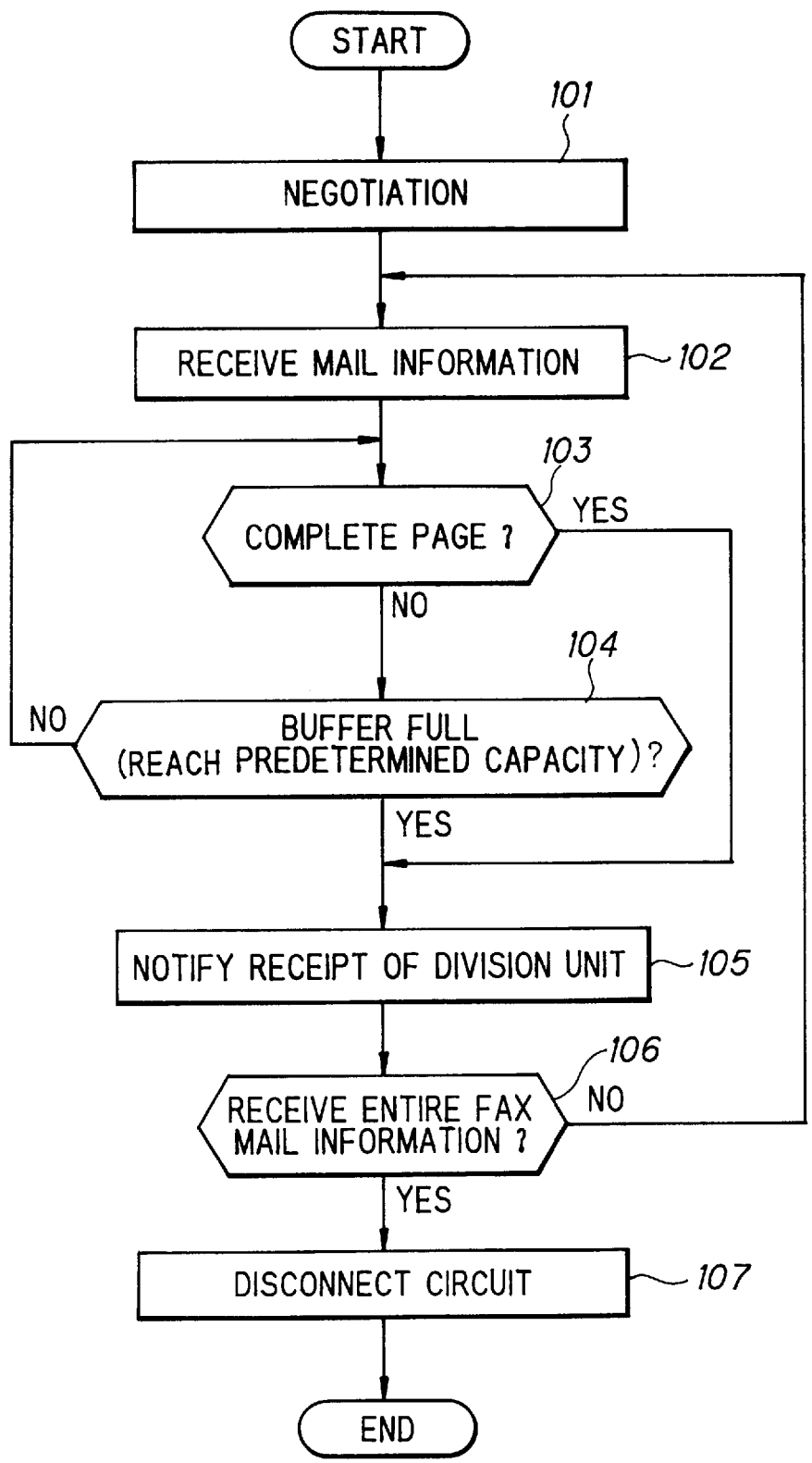
FIG. 7 is a flowchart of the process by the communication processing unit.

FIG. 7 is a process flow in the communication processing units 41a and 41b when receiving the fax mail information by the fax control unit 41-4.

When the fax mail apparatus 40 is called by the originating fax machine, the predetermined negotiation is performed there between, thereby the fax control unit 41-4 receives a requester fax number, a requester ID, delivery conditions (ordinary/express/time-specified/confidential), a destination fax number, and a data transmission speed, and notifies the control processor 42a of them through control processor 42b and the inter-CPU controller 49 (step 101).

If the originator is a proper subscriber, the fax control unit 41-4 instructs the originating fax machine to transmit the fax mail information, and starts receiving of the fax mail information (step 102).

Then, the fax control unit 41-4 continues receipt of the fax mail information, and monitors whether a page end is detected, or whether the buffer having a capacity of the predetermined data size is full (buffer-full) (steps 103 and 104).

When a page end is detected, or the buffer-full is detected, the fax control unit 41-4 notifies the control processor 42b of the completion of receipt of a division unit, thereby the control processor 42b controls to store the division unit in the disk unit 43 (step 105). Then, the fax control unit 41-4 checks for determining whether the entire fax mail information is received (step 106). The fax control unit 41-4 performs the process from the step 102 if it is not received, or disconnects the circuit if it is received (step 107). With such process, the fax mail information is divided into pages, or predetermined buffer size if the amount of data in one page exceeds the predetermined size, and stored in the disk unit 43 by division unit.

(c-2) Delivery reservation table

The delivery reservation table DLET is a table for registering delivery reservation information as shown in FIG. 8. The delivery reservation information is created for each fax mail information and registered in the delivery reservation table DLET. That is, the delivery reservation information is created when the first division unit of the fax mail information is received, registered in the delivery reservation table DLET, and deleted from the table when the delivery is completed. The delivery reservation information includes the following information.

(1) Time when delivery is reserved (delivery reservation time)
(2) Time to start the delivery processing (delivery time)
(3) Delivery processing status (uncompleted/waiting for retransmission/in retransmission)
(4) Requester name
(5) Position of requester
(6) ID number of requester
(7) Fax telephone number of requester (to be used when notifying acceptance of mail and result of the transmission)

(8) Delivery conditions (ordinary/express/time-specified/confidential)

(9) Fax number of destination

(10) Storage location of header file (pointer)

(11) Times of retransmission (times of retransmission already performed/prescribed times)

(12) Number of pages already delivered/total number of pages (page means the division unit)

As described, while the delivery reservation information is created when the first division unit of the fax mail information is received, and registered in the delivery reservation table DLET, the entire fax mail information is not yet received at the time of registration so that the total number of pages (12) is unknown. Accordingly, the maximum number is temporarily registered as the total number of pages at the time of registration (temporary registration), and updated to the actual number of pages when the entire fax mail information is received.

(c-3) Configuration of fax mail information to be stored in disk unit

Figure 9:
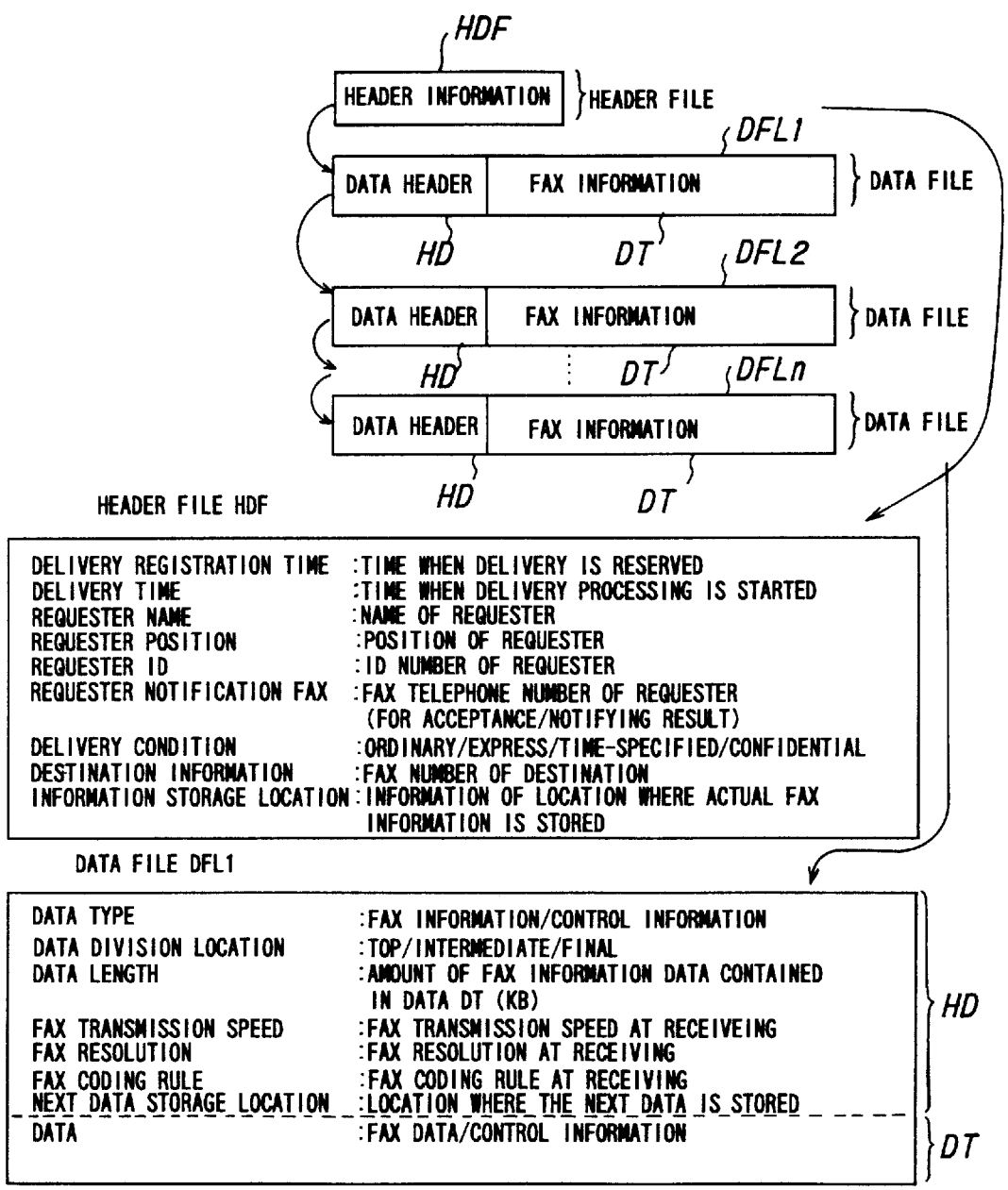
FIG. 9 is a diagram showing the structure of fax mail information.

FIG. 9 is a diagram illustrating the configuration of fax mail information to be stored in the disk unit 43. HDF is a header file, and DFL1, DFL2, . . ., DFLn are data files created for each division unit, each of which contains the data header HD and the fax information DT, and is registered in the disk unit 43. The header file HDF is created for each fax mail information, and includes the following information.

(1) Time when delivery is reserved (delivery reservation time)

(2) Time to start the delivery processing (delivery time)

(3) Requester name (4) Position of requester (5) ID number of requester (6) Fax telephone number of requester (to be used when notifying acceptance of mail and result of the transmission)

(7) Delivery conditions (ordinary/express/time-specified/confidential)

(8) Fax number of destination (9) Storage location of top data file DFL1 (pointer)

Furthermore, the data header HD in each data file DFLi (i=1, 2, . . . , n) includes the following information.

(1) Distinction of fax information/control information (type of data)

(2) Data dividing position (top, intermediate, or final)

(3) Data length (amount of fax information data contained in data portion DT (KB))

(4) Fax transmission speed at receiving (the transmission speed to destination being equal to or less than the receiving speed)

(5) Fax resolution at receiving (6) Fax coding rule at receiving (7) Location where the next data file is stored (pointer)

The fax transmission speed at receiving is managed by page, and the delivery is arranged to be performed at that speed or lower. The reason why the fax transmission speed is managed for each page lies in that the transmission speed varies by fallback. The fallback means to lower the transmission speed so that data can be properly transmitted when the circuit quality is poor. In the fax transmission, negotiation is performed between the originating fax machine and the destination fax machine to check whether data can be properly received at 9600 bps. The data can be properly received if the circuit condition is favorable, but cannot be received if it is poor. In the latter case, the transmission speed is lowered to 7200 bps. If data cannot be yet properly received, the transmission speed is further lowered until a speed enabling proper data transmission is found, and, then, data is transmitted at that speed in actual data transmission.

The header file HDF and the data files DFL1, DFL2, . . ., DFLn (n being the maximum number of pages) for each page are created at the time of provisional registration and stored in the predetermined location in the disk unit 43.

At the time of the provisional registration, the data file DFL1 for the first page contains actual data because that page has been received. However, since the second page and the subsequent pages are not yet received, each entry in the data file DFLi (i=2, 3, . . . , n) contains a provisional value, and the data length, for example, is the maximum value of the division unit (buffer size). In addition, the pointer in the respective data files DLF1–DFLn is a provisional pointer to point a location of the next provisional data file.

At the time of the provisional registration after receipt of the first page, the delivery reservation information is registered in the table DLET and the header file HDF and the data files DLF1–DFLn are created and linked by the pointers. As a result, the receipt of the first page is regarded as the receipt of the entire fax mail information.

Thereafter, when the second page is received, the data file DFL2 is created, its storage location is determined, and then the data file DFL2 is stored at the storage location. At this time, while the pointer value (provisional pointer value) of the data file DFL1 is changed to point the top storage location of the data file DFL2, the pointer of the data file DFL2 is kept provisional.

Thereafter, every time when the mail information of the third page and the subsequent pages are received, similar processing to the above is performed.

(d) Functional Configuration of Fax Mail Apparatus

Figure 10:
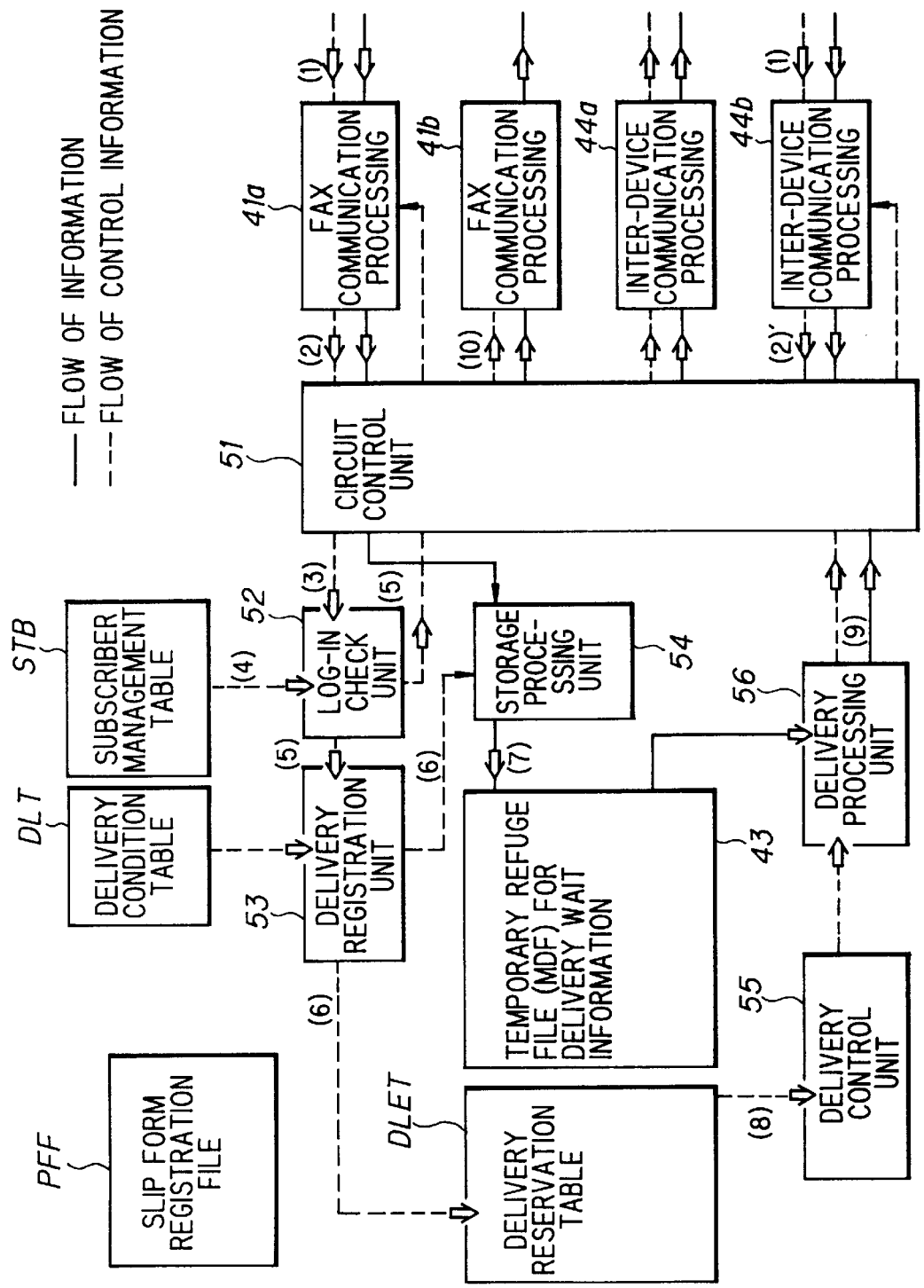
FIG. 10 is a functional block diagram of the fax mail apparatus.

FIG. 10 is a functional block of the fax mail apparatus. In the figure, there are shown fax communication processing units 41a–41b, a disk unit 43, inter-device communication processing units 44a–44b. There are also shown a circuit control unit 51, a log-in check unit 52, a delivery registration unit 53, a storage processing unit 54, a delivery control unit 55, a delivery processing unit 56, a subscriber management table STB, a delivery condition table DLT, a delivery reservation table DLTE, and a slip form registration file PFF.

(d-1) Overall process flow (1) The user instructs a subscriber ID, and a destination and a delivery condition through a fax machine or telephone.

(2) The fax communication processing unit 41a notifies the circuit control unit 51 of the call and the user-instructed information. This is the case of the request from a fax machine. Alternatively, (1)' The subscriber ID, and the destination and delivery condition may be instructed by another fax mail apparatus through a circuit. In such case, (2)' the inter-device communication processing unit 44a notifies the circuit control unit 51 of the call and the user-instructed information.

(3) The circuit control unit 51 inputs the user-instructed information to the log-in check unit 52.

(4) The log-in check unit 52 fetches the information such as the subscriber ID from the subscriber management table STB, checks for agreement in regard to the ID, and confirms validity of the requester.

(5) If the requester is valid, the log-in check unit 52 starts the delivery registration unit 53, and notifies the fax communication processing unit 41a of starting of receiving of mail information (document) through the circuit control unit 51. If the requester is not valid, the log-in check unit 52 instructs the fax communication processing unit 41a to disconnect the circuit through the circuit control unit 51.

(6) The delivery registration unit 53 receives the requester name, his or her position, the fax number, and the delivery condition through the log-in check unit 52, and determines under what condition a delivery circuit should be selected, and times and interval of retransmission by referencing the delivery condition table DLT. That is, since in correspondence to the subscriber the delivery condition table DLT stores the priority of delivery, the circuit selection condition, and the delivery conditions such as times and interval of retransmission, the delivery registration unit 53 determines the delivery condition from the table based on the requester of fax mail. Then, the delivery registration unit 53 creates the delivery reservation information after the first page is received and registers it into the delivery registration table DLET, as well as it creates the header file HDF and the data files DFL1–DFLn and inputs them to the storage processing unit 54. Herein, the data file DFL1 is an actual data file and the data files DFLi (i=2, 3 . . . ) are provisional files.

(7) The storage processing unit 54 stores the header file and the data files in the disk unit 43, thereby a temporary refuge file MDF is created for delivery wait information. In addition, the storage processing unit 54 replaces the provisional data files with actual data files created by using the fax mail information of division unit (referred to as page unit) entered from the circuit control unit 51.

(8) The delivery control unit 55 checks whether there exists delivery wait information by reference to the delivery reservation table in accordance with the interval timer. If exists, the delivery control unit 55 starts the delivery processing unit 56 and delivers the delivery reservation information.

(9) The delivery processing unit 56 requests the circuit control unit 51 to acquire a circuit. (10) After acquisition of the circuit, the circuit control unit 51 receives the fax mail information by division unit, and delivers it to the specified destination.

(d-2) Processing by delivery registration unit

Figure 11:
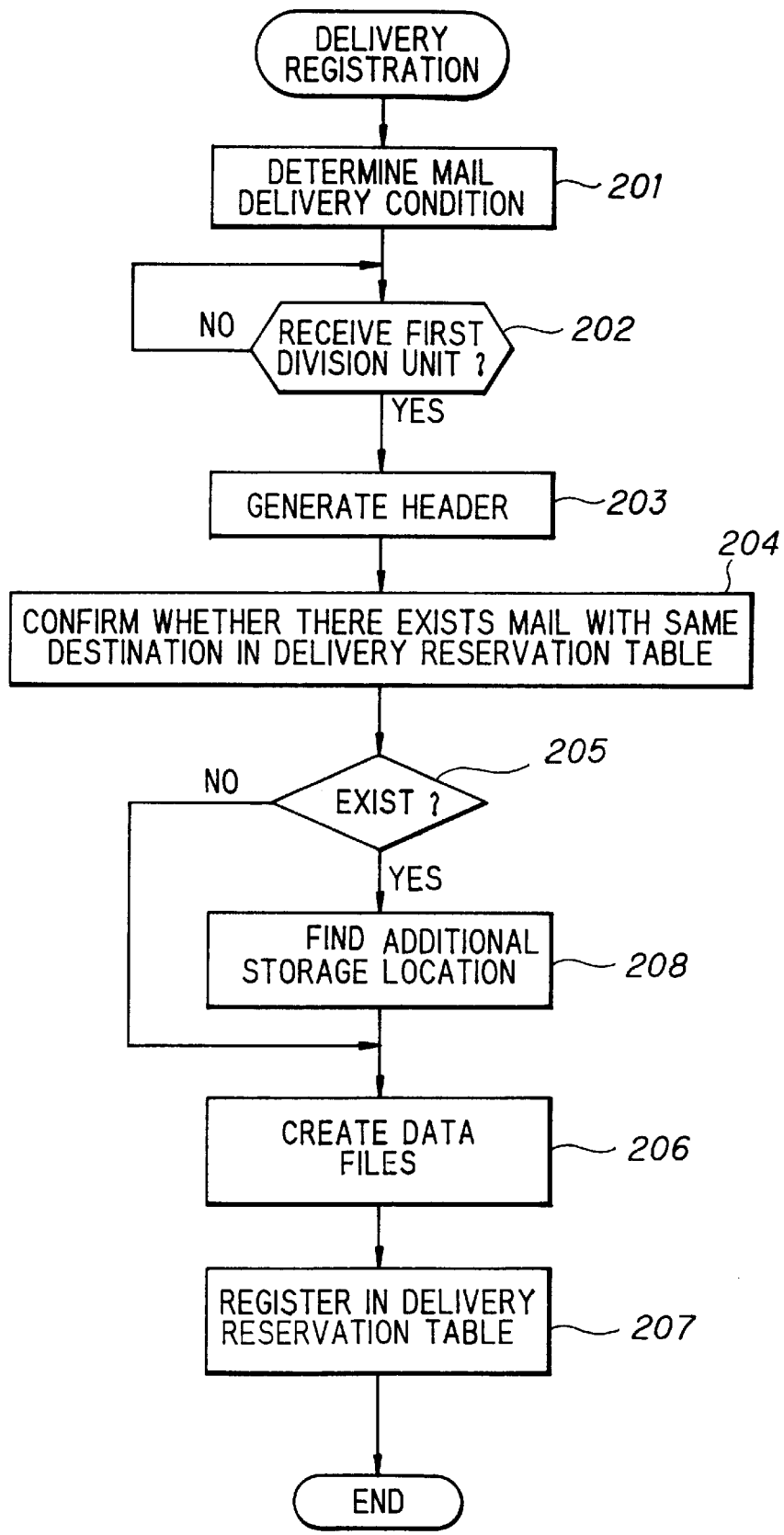
FIG. 11 is a process flowchart for delivery registration.

FIG. 11 is a flowchart of process by the delivery registration unit 53. When the delivery registration unit 53 is started by log-in check unit 52, it determines the mail delivery condition by referring to the subscriber management table STB, the delivery condition table DLT and the like (step 201). Then, when receipt of the first of the fax mail information is notified by the circuit control unit 51 (step 202), the delivery registration unit 53 creates the header file HDF (step 203). Then, it checks whether the reservation information having the same destination has been already registered in the delivery reservation table DLET (steps 204 and 205). If not registered, it creates a data file DFL1 and provisional data files DFL2–DFLn, and inputs them with the header file HDF to the storage processing unit 54 (step 206). In addition, it creates the delivery reservation information, and registers it in the delivery registration table DLET (step 207).

On the contrary, if the delivery reservation information having the same destination has been registered, the delivery registration unit 53 finds an additional storage location (step 208). That is, it finds the storage location of the last page in the delivery reservation information (fax mail information) having the same destination.

Thereafter, the delivery registration unit 53 creates a data file DFL1 and provisional data files DFL2–DFLn, and inputs (1) the header file HDF, (2) the data files DFL1–DFLn, and (3) the additional storage location information to the storage processing unit 54 (step 206). In addition, it creates and registers the delivery reservation information in the delivery reservation information table DLET, and writes "existence" of the additional reservation information in the registered delivery reservation information having the same destination (step 207).

(d-3) Processing by storage processing unit

Figure 12:
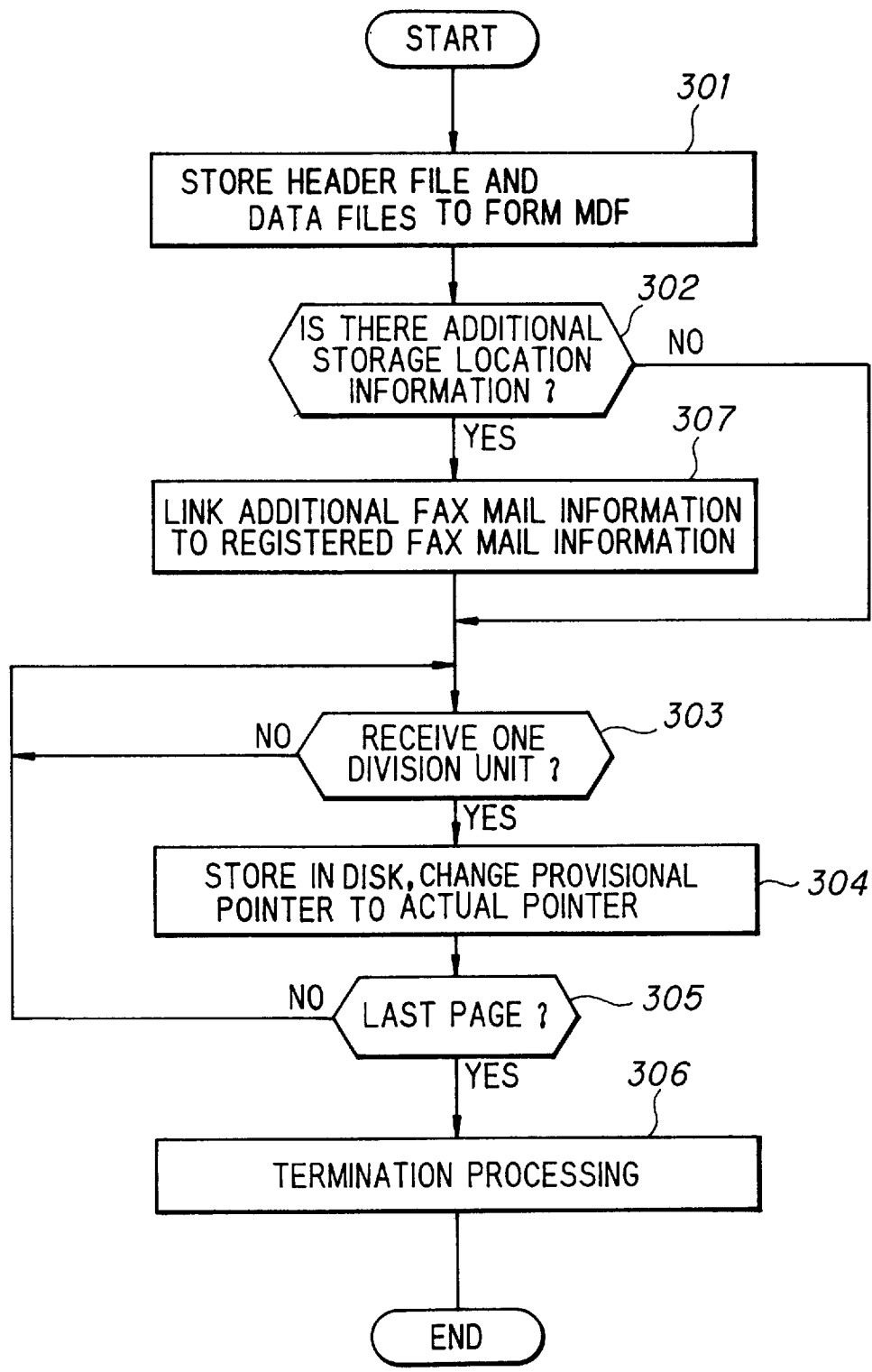
FIG. 12 is a flowchart for storing process.

FIG. 12 is a flowchart of process by the storage processing unit 54.

The storage processing unit 54 stores in the disk unit 43 the header file HDF and the data files DFL1–DFLn, thereby creates the temporary refuge file MDF for delivery wait information entered from the delivery registration unit 53 (step 301).

Then, the storage processing unit 54 checks whether the additional storage location information has been entered from the delivery registration unit 53 (step 302). If it is not entered, the storage processing unit 54 monitors whether the fax mail information of the next division unit (second page) is entered through the circuit control unit 51 (step 303). When it is entered, the storage processing unit 54 creates the data file DFL2 for the second page consisting of actual data, determines its storage location, and stores the data file DFL2 in that storage location. In addition, it changes the pointer value (provisional pointer value) of the data file DFL1 to point the top of the data file DFL2 (step 304). In this case, the pointer of the data file DFL2 is arranged to point the storage location for the provisional third page.

Then, the storage processing unit 54 checks whether the registered page is the last page (step 305), and, if not, repeats the process from the step 303 to continue the storage processing for subsequent pages. However, if it is the last page, it performs the termination processing (step 306), and prepares for receiving of the next fax mail information. In this termination processing, the item of the data dividing position contained in the header of the last data file is made the "final."

When the additional storage location information is entered from the delivery registration unit 53 at the step 302, the storage processing unit 54 reads the header of a data file stored at the location pointed by the additional storage location information, and changes the pointer of the header to point the first data file location of the additional fax mail information (step 307). Thereby, the last data file of the registered fax mail information having the same destination is liked to the top data file of new fax mail information to be additionally registered.

Then, it performs the processing from the step 303 and subsequent steps to add the fax mail information.

(d-4) Delivery control processing

Figure 13:
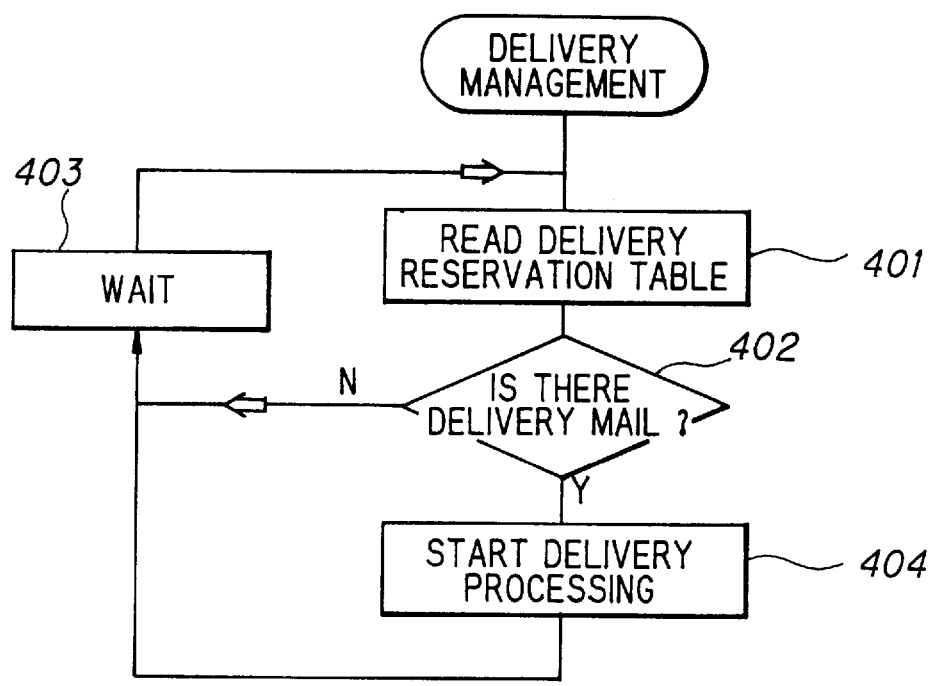
FIG. 13 is a process flowchart for delivery control.

FIG. 13 is a flowchart for the delivery control processing by the delivery control unit 55.

The delivery control unit 55 reads the delivery reservation table DLET at every predetermined sampling time (step 401), monitors whether a fax mail to be delivered is registered (step 402), if not, waits for a predetermined period of time (step 403), and performs the processing from the step 401 and subsequent steps. On the contrary, if there exists a fax mail reserved for delivery, it starts the delivery processing unit 56 to perform the delivery of the fax mail information (step 404).

Then, the delivery control unit 55 repeats the above processing at every predetermined period of time to deliver the fax mail information reserved for delivery to a specified destination.

(d-5) Delivery processing

Figure 14:
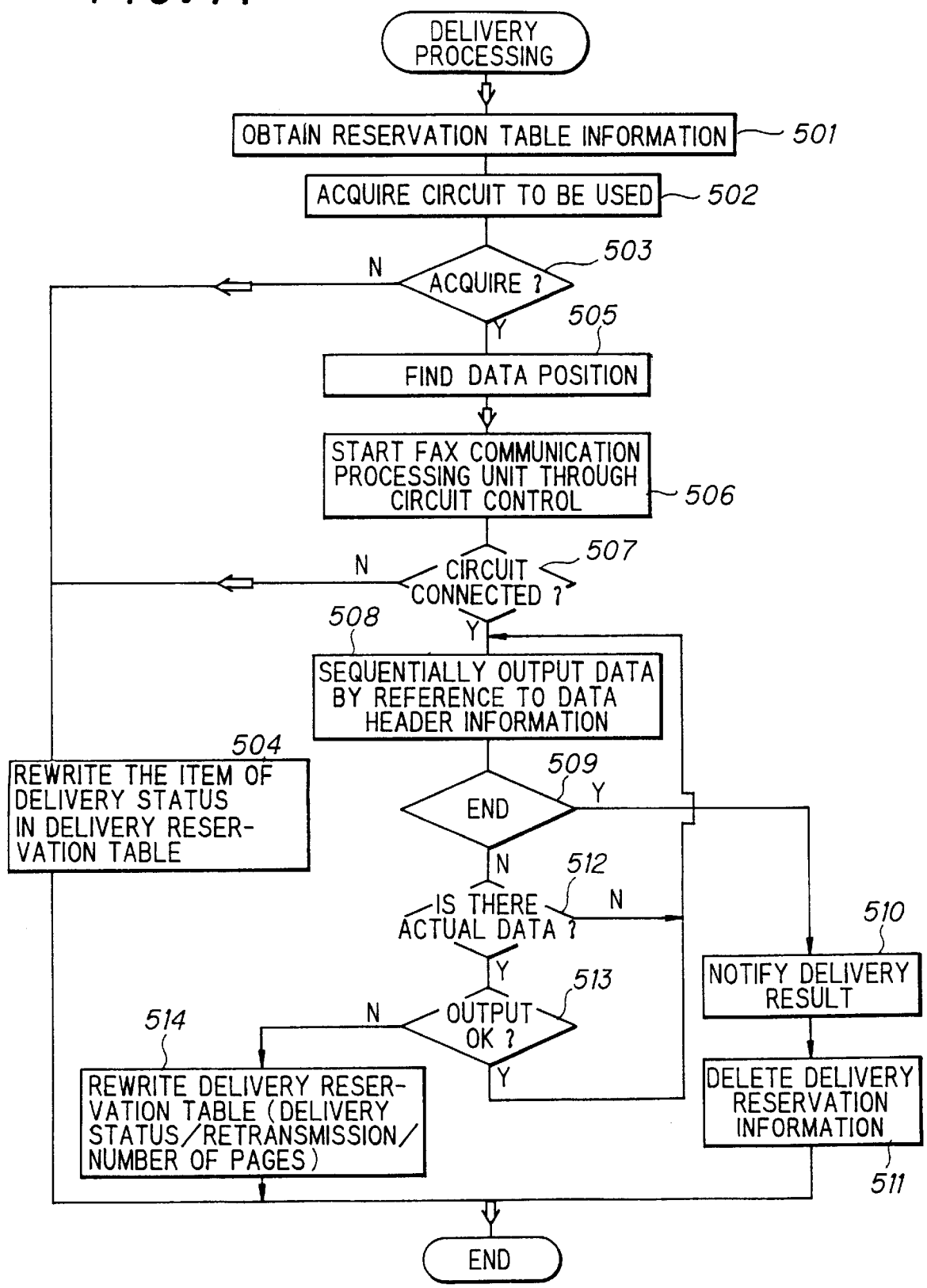
FIG. 14 is a flowchart for delivery process.

FIG. 14 is a flowchart for the delivery processing by the delivery processing unit 56.

When started by the delivery control unit 55, the delivery processing unit 56 reads the delivery reservation information from the table DLET (step 501). Then, it requests the circuit control unit 51 to acquire a circuit to be used (step 502). If a circuit cannot be acquired because all fax communication processing units 41a–41b are busy (step 503), the delivery control unit 55 rewrites the item of the delivery processing status in the delivery reservation table (step 504), and waits for the next start-up.

On the contrary, if a circuit can be acquired, the delivery processing unit 56 finds the header file location of the fax mail information reserved for delivery (step 505). In a case where fax mail information waiting for retransmission is retransmitted from an intermediate page, it finds the location of such intermediate page.

Then, the delivery processing unit 56 starts an appropriate fax communication processing unit through the circuit control unit 51, and the fax communication processing unit calls the destination fax machine (step 506). The delivery processing unit 56 checks whether the circuit is established there between (step 507), if not, performs the processing of the step 504, and wait for the next start-up.

If a circuit is established, however, the delivery processing unit 56 transfers the fax mail information of the first page under the delivery condition specified by the header of the data file DFL1 (step 508). Then, it checks whether the delivery of all pages completes (step 509), if so, notifies the requester of the delivery result (step 510), deletes the corresponding delivery reservation information from the reservation table DLET (step 511), and waits for the next start-up.

If the delivery of all pages does not complete at the step 509, the delivery processing unit 56 checks whether or not actual data for the next page exists at the storage location pointed by the pointer (step 512). If the actual data for the next page exists, and the transmission of the data is possible (step 513), the delivery processing unit 56 transfers the fax mail information of that page in accordance with the processing of the step 508. Then, in the normal state, the processing at steps 508–509, 512–513 is performed to finally complete the delivery of all pages.

On the contrary, in the event where transmission of the fax mail information becomes impossible because the circuit is disconnected by some cause, the step 513 becomes NO. The delivery processing unit 56 rewrites the items of the delivery processing status, the times of retransmission, and the number of pages to be delivered in the delivery reservation information by the values corresponding to the actual state (step 514), and waits for the next start-up. The fax mail information the transmission of which is disconnected during transmission is caused to wait for retransmission, and retransmitted afterward.

If the actual data for the next page does not exist at the step 512, the processing in the step 508 and the subsequent steps, is repeated. In the event where no actual data exists, the processing of steps 508, 509, and 512 are repeated, thereby processing of reading data is skipped. Thus, in a case where the data file of the top page of the additional fax mail information is linked to the data file of the last page, then the additional fax mail information is delivered. That is, continuous transmission are allowed without disconnecting the circuit.

(e) Next Page Preparation Time According to the Present Invention

According to the present invention, one message (fax mail information) is divided by page or predetermined buffer length, and a data file is created for each division unit. In addition, the transmission speed of each file in receiving is recorded and communication with a destination fax machine is performed at a speed slower than that speed in delivering of the files. This surely makes the next page preparation time equal to the prescribed timer value between pages (=35 seconds) or less than it so that the delivery can be performed without interruption.

Figure 15:
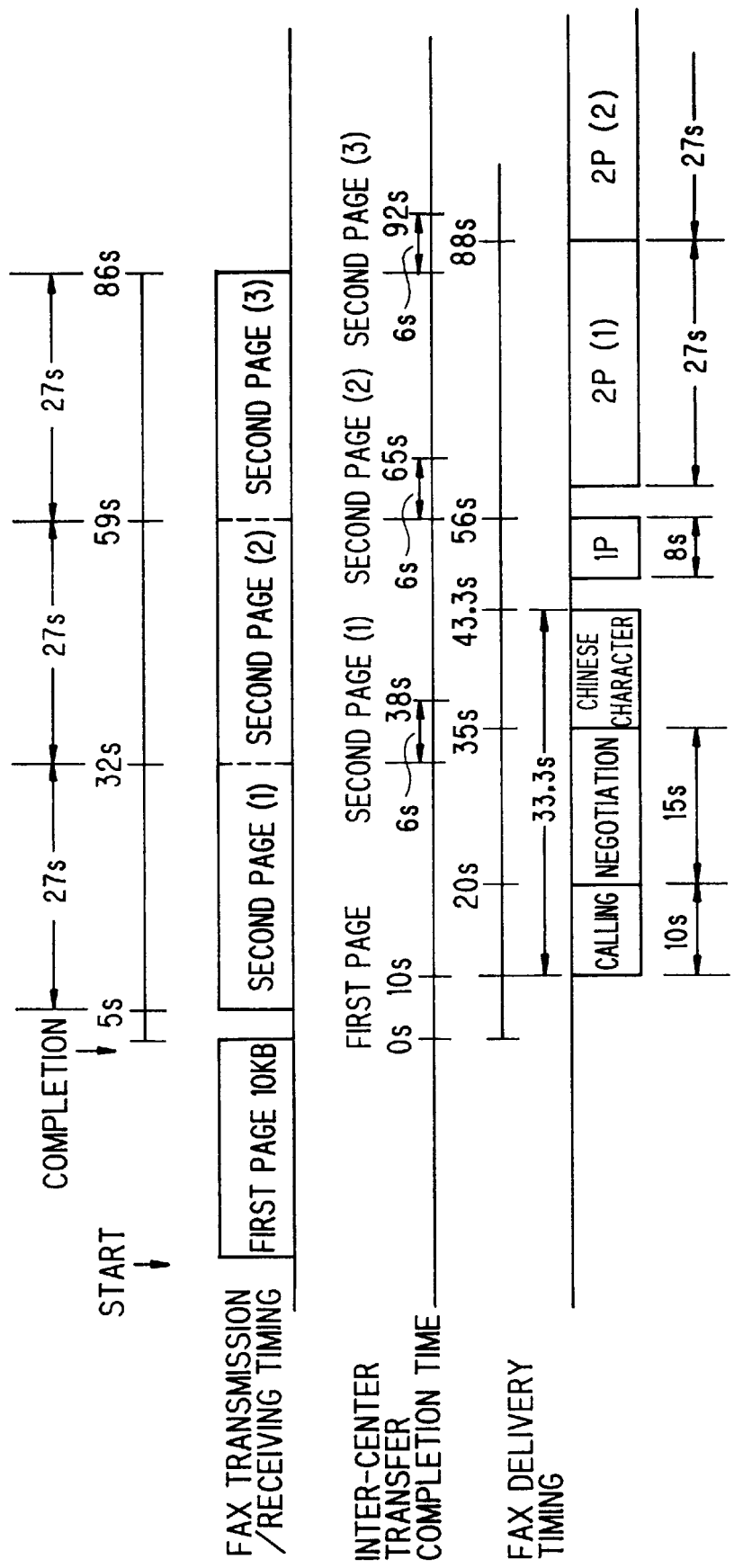
FIG. 15 is a diagram for illustrating the margin for preparing the next page.

FIG. 15 is a diagram illustrating a margin for the "next page preparation time" under the following estimation condition. It is a case where the fax mail information is transferred from an originating fax machine to a destination fax mail apparatus through an originating fax mail apparatus, and, then, the destination fax mail apparatus calls a destination fax machine and transfers the fax mail information.

Estimation condition:

(1) In a case where the size of the buffer unit is 32 KB
Time required for transferring one division unit from a fax machine to a fax mail apparatus (fax time)=27 s
Time required for transferring one division unit between fax mail apparatuses (referred to as centers)=4 s
Time required for delivery reservation registration or the like (link time)=2 s (2) Time required for transferring a cover letter with addresses written in Chinese character before the first page 33.3 s.

(3) The transmission speed between centers is 64 Kbps.

(4) The breakdown of transmission time between facsimiles is:
Time for dialing the exchange (calling time)=10 s,
Negotiation time=15 s,
Information transmission speed=1.2 KB/s (=9,600 bps), and
Time between pages=5 s–30 s.

(5) Time required for store-and-forward=6 s

The upper section of FIG. 15 shows transmission/receiving timing of division unit (page unit) by the originating fax machine and the originating fax mail apparatus. That is, it shows that the transmission (receiving) is started at the leading edge of each rectangle, and terminated at the trailing edge. The middle section shows the end time when the transfer of information for each division unit (page unit) completes between centers. The lower section shows the transmission/receiving timing in the page unit between the destination fax mail apparatus and the destination fax machine.

The destination fax mail apparatus immediately calls the destination fax machine at the completion of receiving of the first page, performs the negotiation there between, and sends the cover letter with addresses written in Chinese character. In this case, it is necessary to deliver the first page to the destination fax machine within 35 seconds after the completion of transmission of the cover letter (time=43.3 s). However, since the transmission of the first page between the centers has already completed at the time=10 s, the first page can be delivered from the destination mail apparatus to the destination fax machine with sufficient margin. In this case, even if receiving of the first page is delayed by 33.3 s (=43.3 s–10 s), the next page preparation time necessary for delivering the first page to the destination fax machine is not changed. In other words, the margin for the first page is 33.3 s (=43.3 s–10 s). Similarly, the margin for the first part of the second page is 18 s (=56 s–38 s), and that for the middle part of the second page is 23 s (=88 s–65 s).

Although the next page preparation time may be made less than the prescribed timer value (=35 seconds) between pages even if there is no cover letter, the margin is reduced to 25 s (=35 s–10 s). The margin may be adjusted based on the buffer capacity.

Figure 16:
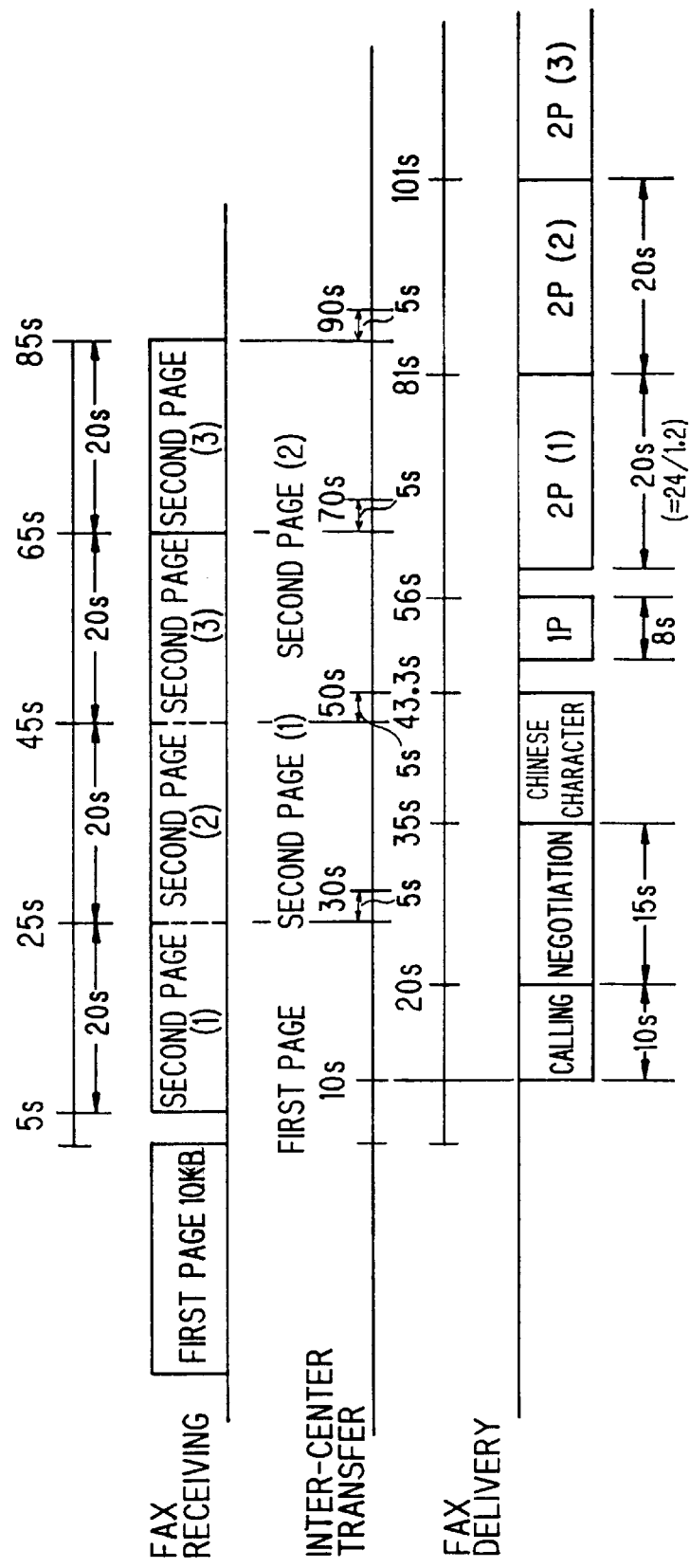
FIG. 16 is an another diagram for illustrating the margin for preparing the next page.
Figure 17:
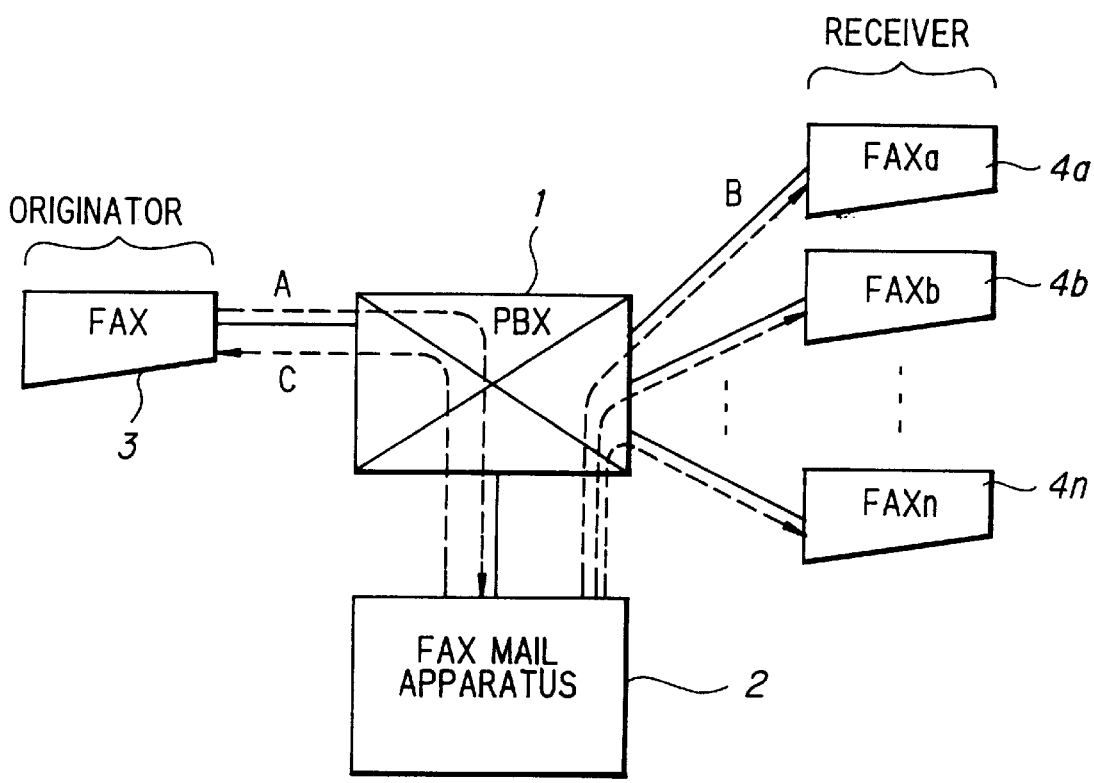
FIG. 17 is a diagram showing the construction of a conventional communication system having a mail function.
Figure 18:
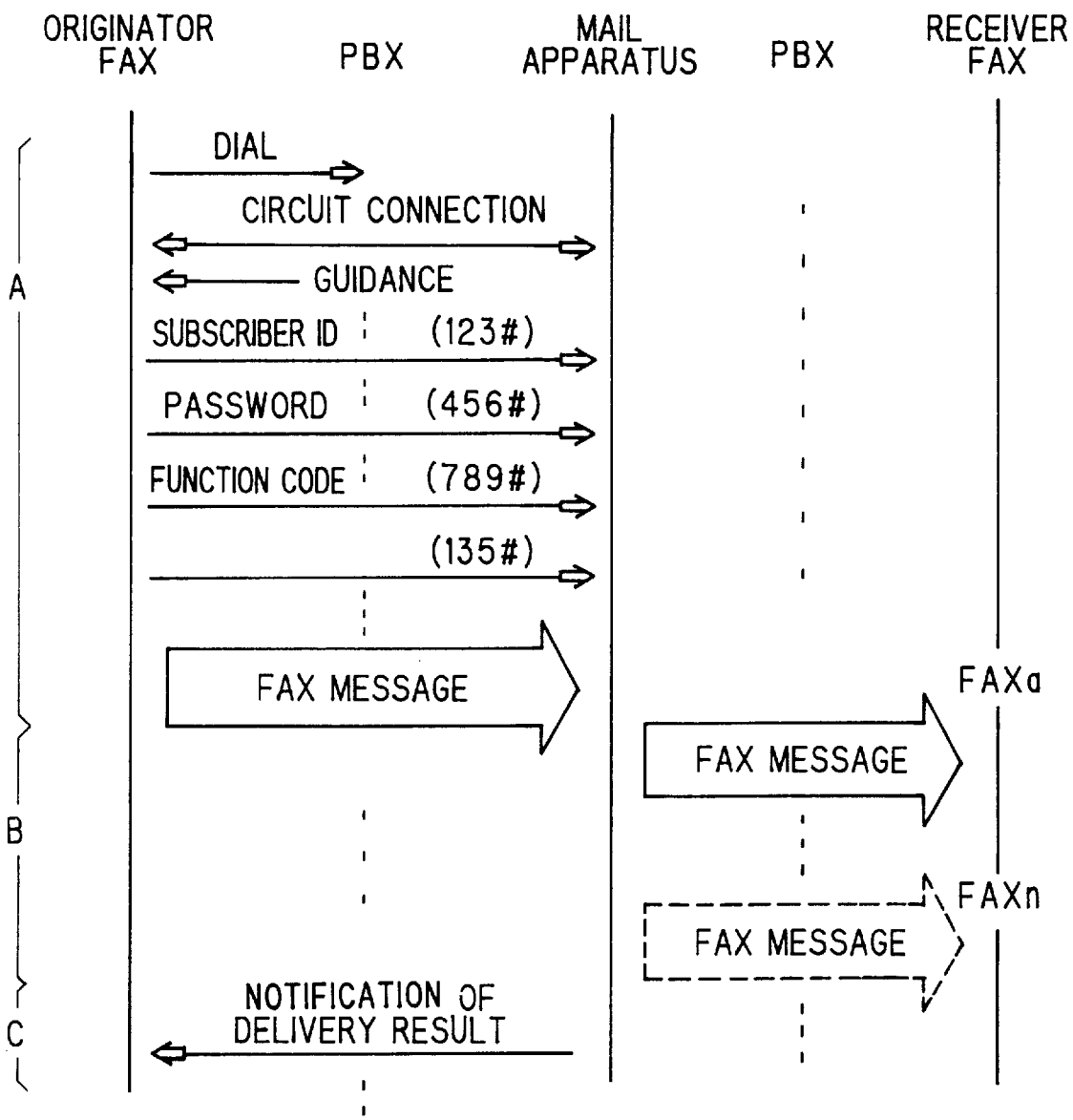
FIG. 18 is a diagram for illustrating the procedure of mail transmission.

FIG. 16 is a diagram illustrating the margin of "next page preparation time" at the buffer capacity=24 KB. With the buffer capacity=24 KB, the fax time, the time between centers time and the link time are as follows:

(1) Time required for transferring on division unit from a fax machine to a fax mail apparatus (fax time)=20
(2) Time required for transferring one division unit between fax mail apparatuses (centers)=3 s, and
(3) Time required for the delivery reservation registration or the like (link time)=2 s.

When the buffer capacity is reduced to 24 KB, the margin for the first page is 33.3 s (=43.3 s–10 s), that for the first part of the second page is 26 s (=56 s–30 s), and that for the middle part of the second page is 31 s (=81 s–50 s), which are larger than those at the buffer capacity=32 KB.

The present invention is arranged not to cause any adverse effect on the margin even if the transmission speed is changed by fallback. That is, when the transmission speed of the destination fax mail apparatus becomes slower due to the follback, the margin increases and there is no problem. In addition, even if the transmission speed of the originating fax machines becomes slower due to the fallback, there arises no problem because the speed is matched by the negotiation between the destination fax mail apparatus and the destination fax machine. That is, the destination fax mail apparatus negotiates with the destination fax machine at the speed of transmission contained in the data header HD of the data file, and performs delivery the data at that speed or lower speed. Thus, even if the transmission speed of the originating fax machine becomes slower due to the falls back, the destination fax mail apparatus can always perform delivery the data at the transmission speed or lower from the originating fax machine so that no adverse effect is caused on the margin.

Thus, according to the present invention, the destination fax machine can output the document more quickly without regard to the number of pages of the document because it is arranged that the fax mail information is divided by page or predetermined buffer size, receipt of the first division unit is regarded as receipt of the entire fax mail information, and the fax mail information is transmitted to a destination fax machine by division unit after the receipt of the first division unit.

According to the present invention, the document is delivered in a time substantially equal to that in an conventional inter-fax communication, and the fax transmission charge is saved because the transmission is performed through a public-leased-public connection.

Furthermore, according to the present invention, since one page of the document is divided by a predetermined buffer size if the page contains much amount of data, the fax mail apparatus can receive the next division unit before completion of the transmission of the current division unit. Thus, the fax mail apparatus can transmit the next division unit to a destination fax machine within the prescribed period of time after completion of the transmission of the current division unit so that it can continuously transmit entire fax mail information in one circuit connection without interruption.

Furthermore, according to the present invention, since the fax mail apparatus records the speed for receiving the fax mail information sent from a originating fax machine (the speed is known from the negotiation), and makes the transmission speed for delivering the fax mail information to a destination fax machine slower than the receiving speed, the fax mail apparatus can receive and hold the fax mail information of the next division unit before completion of the transmission of the current division unit. Thus, the fax mail apparatus can surely start the transmission of the next division unit within the prescribed period of time after completion of the transmission of the current division unit so that it can continuously transmit entire fax mail information in one circuit connection.

Furthermore, according to the present invention, since the receiving speed is recorded for each division unit, and the transmission speed is made slower than the receiving speed for each division unit, the fax mail apparatus is not adversely affected by the fallback so that it can surely start the transmission of the next division unit within the prescribed period of time.

Furthermore, according to the present invention, there is provided a delivery reservation table which stores delivery reservation information including at least the transmission requester, the destination, the distinction of uncompleted transmission or waiting for retransmission, and the number of units completed for transmission by the division unit in the case of waiting for retransmission in correspondence to the fax mail information requested for transmission. If the circuit is disconnected during transmission to the destination, the number of units waiting for retransmission and those completed for transmission are written in the corresponding delivery reservation information in the delivery reservation table. Then, the fax mail information waiting for retransmission is found by reference to the delivery reservation table, and retransmitted by division unit. With such arrangement, even if the circuit is disconnected by some cause during transmission, the fax mail information can be automatically retransmitted once the cause is eliminated.

Furthermore, according to the present invention, there is provided a delivery reservation table which stores delivery reservation information including at least the transmission requester, the destination, the distinction of uncompleted transmission or waiting for retransmission, and the number of units completed for transmission by the division unit in the case of waiting for retransmission in correspondence to the fax mail information requested for transmission. When new fax mail information is requested for transmission, the delivery reservation table is checked for determining whether fax mail information having the same destination is registered therein. If registered, the new fax mail information is added to the reserved fax mail information. With such arrangement, the fax mail information having the same destination can be transmitted in one circuit connection.

As many apparently widely different embodiments of the present invention can be made without departing from the spirit and scope thereof, it is to be understood that the invention is not limited to the specific embodiments thereof except as defined in the appended claims.

What is claimed is:

1. A store-and-forward method for a fax mail apparatus for storing mail information being sent from a fax machine and transmitting said mail information to a designated destination, comprising steps of:

dividing at said fax mail apparatus an entire received mail information into division units by page, or by predetermined size if an amount of data in a page exceeds said size;

regarding receipt of a first division unit at said fax mail apparatus as receipt of the entire mail information; and sequentially transmitting the received mail information by said division units from the fax mail apparatus, as an originating apparatus, to a destination fax machine.

2. The store-and-forward method for a fax mail apparatus according to claim 1 further comprising steps of:

providing a destination fax mail apparatus;

connecting said originating fax mail apparatus to said destination fax mail apparatus with a leased circuit; and sequentially transmitting the mail information, being sent from the originating fax mail apparatus through the leased circuit from the destination fax mail apparatus to a destination fax machine by division unit.

3. The store-and-forward method for a fax mail apparatus according to claim 1 further comprising steps of:

creating one header file for each mail information based on negotiation with the originating fax machine, and creating a data file containing a header and fax data for each of said division units; and pointing a storage location of the next data file with a pointer of a header file and a pointer of each data file; and continuously transmitting the mail information to the destination fax machine in the division units by reference to said pointers.

4. The store-and-forward method for a fax mail apparatus according to claim 3 further comprising steps of:

storing a receiving speed for the mail information being sent from the originating fax machine; and making transmission speed of said fax mail apparatus equal to or less than said receiving speed, when said mail information is transmitted to a destination fax machine in the division units, thereby a next division unit is received from said originating fax machine and stored in a memory prior to completion of transmission of a current division unit, and after completion of transmission of the current division unit, the next division unit is transmitted to the destination fax machine so that the entire mail information is continuously transmitted.

5. The store-and-forward method for a fax mail apparatus according to claim 3 further comprising steps of:

providing a delivery reservation table which stores delivery reservation information including at least a transmission requester, destination, distinction of uncompleted transmission or waiting for retransmission, and number of said units completed for transmission by the division unit in a case of waiting for retransmission in correspondence to the fax mail information requested for transmission;

inserting data, which means waiting for retransmission and the number of units completed for transmissions, in said corresponding delivery reservation information in said delivery reservation table, when a circuit is disconnected during transmission to the destination;

finding the delivery reservation information by reference to said delivery reservation table; and transmitting information uncompleted for transmission of the mail information corresponding to said found delivery reservation information by said division unit.

6. The store-and-forward method for a fax mail apparatus according to claim 3 further comprising steps of:

providing a delivery reservation table which stores delivery reservation information including at least a transmission requester, a destination, a distinction of uncompleted transmission or waiting for retransmission, and number of units completed for transmission by the division unit in a case of waiting for retransmission in correspondence to the fax mail information requested for transmission;

when new fax mail information is requested for transmission, checking the delivery reservation table to find delivery reservation information including the same destination as the destination of the new fax mail information;

adding the new fax mail information to stored fax mail information corresponding to the found delivery reservation information; and transmitting the fax mail information with the same destination in one circuit connection.

7. The store-and-forward method for a fax mail apparatus according to claim 6, wherein the new mail information is added to the stored mail information by linking the last data file of the stored mail information to the top data file of the new mail information by a pointer.

8. A store-and-forward method for a fax mail apparatus for storing mail information being sent from a fax machine and transmitting said mail information to a designated destination, comprising steps of:

dividing at said fax mail apparatus an entire received mail information into division units by page when an amount of data in a page is a predetermined size or less, and dividing by said size when the amount of data in a page exceeds said predetermined size;

regarding receipt of a first of said division units as receipt of the entire mail information; and sequentially transmitting the received mail information by said division units from the fax mail apparatus to a destination fax machine.

9. A fax mail apparatus for storing mail information being sent from a fax machine and for transmitting said mail information to a designated destination, comprising:

a receiver unit for receiving an entire mail information from a circuit;

dividing means for dividing the received mail information into division units by page or predetermined size and linking each division unit by a pointer;

storage means for storing the mail information in each division unit linked by the pointers;

a delivery processing unit for regarding receipt of a first division unit as receipt of the entire mail information, and, then for performing processing for sequentially delivering the received mail information by said division units to a destination; and a transmitter unit for transmitting the mail information by division unit.

10. The fax mail apparatus according to claim 9, wherein said transmitter unit sequentially transmits the mail information being sent from an originating fax mail apparatus through a leased circuit to a destination fax machine in said division units.

11. A fax mail apparatus for storing mail information being sent from a fax machine and transmitting said mail information to a designated destination, comprising:

a receiver unit for receiving an entire mail information from a circuit;

dividing means for dividing the received mail information into division units by page if the amount of data in a page is a predetermined size or less, and by said size if the amount of data in a page exceeds said predetermined sizes, and linking each said division unit by pointers;

storage means for storing the mail information in each said division unit linked by pointers;

a delivery processing unit regarding receipt of a first division unit as receipt of the entire mail information, and, then for performing processing for sequentially delivering the received mail information by said division units to a destination; and a transmitter unit for transmitting the mail information by division unit.

12. A store-and-forward method for a fax mail apparatus for storing mail information being sent from a fax machine and transmitting said mail information to a designated destination, comprising steps of:

dividing at said fax mail apparatus an entire received mail information into division units by page, or by predetermined size if an amount of data in a page exceeds said size;

regarding receipt of a first division unit at said fax mail apparatus as receipt of the entire mail information;

when the first division unit has been received, transmitting said first division unit as a current division unit from the fax mail apparatus to a destination fax machine while receiving and storing a next division unit;

when said current division unit has been transmitted to the destination fax machine, transmitting the received next division unit as a new current division unit from the fax mail apparatus to the destination fax machine, while receiving and storing a next division unit; and sequentially transmitting the received mail information by said division units from the fax mail apparatus to the destination fax machine.

13. A store-and-forward method for a fax mail apparatus for storing mail information being sent from a fax machine and transmitting said mail information to a designated destination, comprising steps of:

dividing a t said fax mail apparatus an entire received mail information into division units by page when an amount of data in a page is a predetermined size or less, and dividing by said size when the amount of data in a page exceeds said predetermined size;

regarding receipt of a first division unit at said fax mail apparatus as receipt of the entire mail information;

when the first division unit has been received, transmitting said first division unit as a current division unit from the fax mail apparatus to a destination fax machine while receiving and storing a next division unit;

when said current division unit has been transmitted to the destination fax machine, transmitting the received next division unit as a new current division unit from the fax mail apparatus to the destination fax machine, while receiving and storing a next division unit; and sequentially transmitting and received mail information by said division units from the fax mail apparatus to the destination fax machine.

14. A fax mail apparatus for storing mail information being sent from a fax machine and for transmitting said mail information to a designated destination, comprising:

a receiver unit for receiving an entire mail information from a fax machine via a circuit;

dividing means for dividing the received mail information into division units by page or predetermined size and linking each division unit by a pointer;

first storage means for storing the mail information in each division unit linked by the pointers;

second storage means for storing a receiving speed for the mail information for each division unit;

a delivery processing unit for regarding receipt of a first division unit as receipt of the entire mail information, and, then for performing processing for sequentially delivering the received mail information by said division units to a destination; and a transmitter unit for transmitting the mail information by division unit at a speed which is equal or less than said receiving speed for each division unit, wherein a next division unit is received from a fax machine and stored in the first storage means prior to completion of transmission of a current division unit, and after completion of transmission of the current division unit, the next division unit is transmitted as a new current division unit to the destination fax machine so that the entire mail information is continuously transmitted in one circuit connection.

15. A fax mail apparatus for storing mail information being sent from a fax machine and transmitting said mail information to a designated destination, comprising:

a receiver unit for receiving an entire mail information from a circuit;

determining means for determining whether or not the size of a page is larger than a predetermined size;

dividing means for dividing the received mail information into division units by page if the size of a page is smaller than a predetermined size, and by said predetermined size if the size of a page exceeds said predetermined size, and linking each said division unit by a pointer;

first storage means for storing the mail information in each said division unit linked by the pointers;

second storage means for storing a receiving speed for the mail information for each division unit;

a delivery processing unit regarding receipt of a first division unit as receipt of the entire mail information, and, then for performing processing for sequentially delivering the received mail information by said division units to a destination; and a transmitter unit for transmitting the mail information by division unit at a speed which is equal or less than said receiving speed for each division unit, wherein next division unit is received from a fax machine and stored in the first storage means prior to completion of transmission of a current division unit, and after completion of transmission of the current division unit, the next division unit is transmitted as a new current division to the destination fax machine so that the entire mail information is continuously transmitted in one circuit connection.

* * * * *